(12) United States Patent

Tsuchiya

(10) Patent No.: US 10,812,722 B2
(45) Date of Patent: Oct. 20, 2020

(54) IMAGING APPARATUS, SHAKE CORRECTION METHOD, LENS UNIT, AND BODY UNIT

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/250,745

(22) Filed: Jan. 17, 2019

(65) Prior Publication Data

US 2019/0230288 A1 Jul. 25, 2019

(30) Foreign Application Priority Data

Jan. 23, 2018 (JP) .................................. 2018-008765

(51) Int. Cl.
*H04N 5/232* (2006.01)
*H04N 5/225* (2006.01)
*G02B 27/64* (2006.01)
*G03B 5/00* (2006.01)

(52) U.S. Cl.
CPC ....... *H04N 5/23287* (2013.01); *G02B 27/646* (2013.01); *H04N 5/2254* (2013.01); *H04N 5/23258* (2013.01); *G03B 2205/0007* (2013.01); *G03B 2217/005* (2013.01)

(58) Field of Classification Search
CPC ........... H04N 5/23287; H04N 5/23258; H04N 5/2254; H04N 5/225; G02B 27/646; G03B 2217/005; G03B 2205/0007; G03B 17/00; G03B 5/00
See application file for complete search history.

(56) References Cited

U.S. PATENT DOCUMENTS

2005/0140793 A1* 6/2005 Kojima ............. H04N 5/23248
348/208.99
2015/0271410 A1 9/2015 Shintani
2016/0330378 A1* 11/2016 Tsuchiya ................ G03B 17/14

FOREIGN PATENT DOCUMENTS

JP 2015-141391 A 8/2015
JP 2015-194687 A 11/2015

* cited by examiner

*Primary Examiner* — Ahmed A Berhan
(74) *Attorney, Agent, or Firm* — Volpe and Koenig, P.C.

(57) ABSTRACT

An imaging apparatus detects a shake, calculates a blurring amount of a subject image on the basis of a result of the detection, calculates a correction amount for canceling blurring of the subject image on the basis of the blurring amount, subtracts a subtraction amount per one correction cycle based on the subtraction amount per predetermined period of time from the blurring amount or the correction amount, shifts a part of the optical system in a direction to cancel blurring of a subject image on the basis of any one of a result of the subtraction and the subtraction amount per one correction cycle, and shifts the image pickup element in a direction to cancel blurring of the subject image on the basis of another of the result of the subtraction and the subtraction amount per one correction cycle.

21 Claims, 19 Drawing Sheets

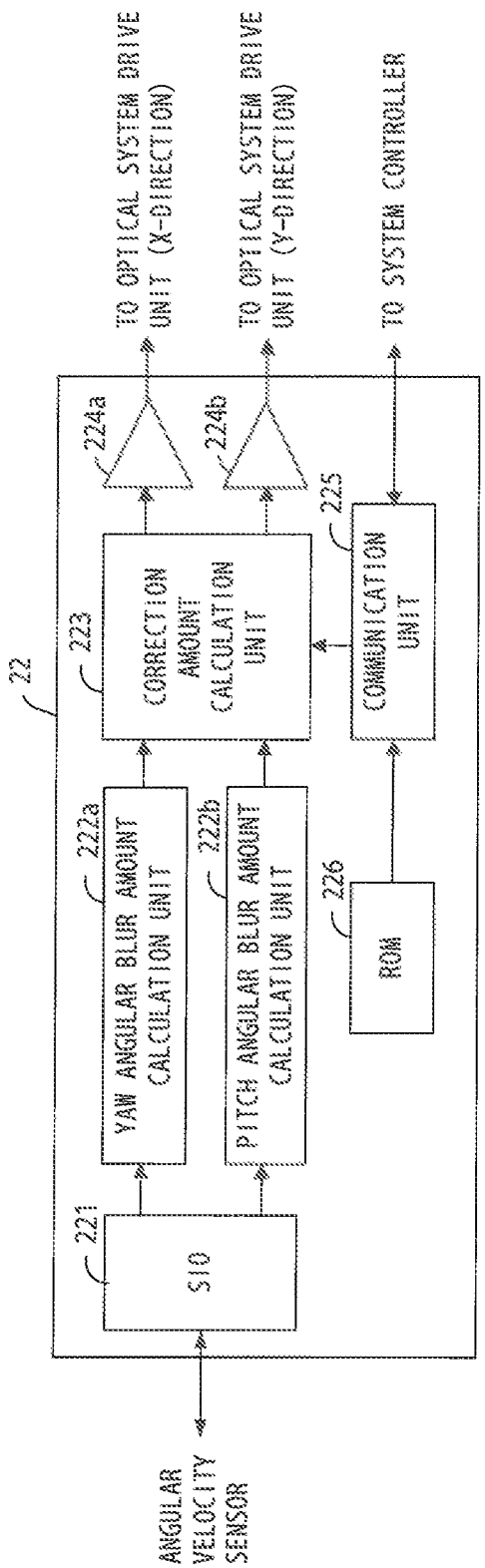
F I G. 16

IMAGING APPARATUS, SHAKE CORRECTION METHOD, LENS UNIT, AND BODY UNIT

CROSS-REFERENCE TO RELATED APPLICATION

This application is based upon and claims the benefit of priority of the prior Japanese Patent Application No. 2018-008765, filed on Jan. 23, 2018, the entire contents of which are incorporated herein by reference.

FIELD

Embodiments of this disclosure relate to an imaging apparatus having image stabilization functions provided in both a body unit (camera body) and a lens unit (replacement lens) to perform shake correction by operating both the image stabilization functions in cooperation, a shake correction method executed in the imaging apparatus, a lens unit, and a body unit.

BACKGROUND

As means (shake correction means) for physically compensating for image blurring generated in a photographed image due to shaking of a camera as an imaging apparatus, the following two types of methods are known in the art:

(1) a method of moving a formed image of a subject by shifting a part of an optical system; and (2) a method of changing a positional relationship between a formed subject image and an image pickup element by moving the image pickup element.

The two types of methods described above have respective advantages. Which means will be optimally employed is naturally selected depending on a camera system.

In general, in a case where the shake correction means is provided in the lens unit, a telephoto setting is more advantageous. Meanwhile, in a case where the shake correction means is provided in the body unit, it is possible to obtain a shake correction effect regardless of the mounted lens unit advantageously.

Under such circumstances, the lens unit provided with the shake correction means may be installed in the body unit provided with the shake correction means in some cases.

A technique of improving performance by combining both the shake correction means in this case is known in the art. For example, the following two techniques are known in the art.

In the first technique (for example, Japanese Laid-open Patent Publication No. 2015-141391), a camera system has a lens unit and a body unit, the body unit having a blurring correction unit that performs blurring correction in a plurality of directions and a determination unit that determines whether or not the mounted lens unit is capable of performing blurring correction in a plurality of directions. If the determination unit determines that the lens unit is capable of performing blurring correction in a plurality of directions, the body unit performs blurring correction in a plurality of directions on the basis of a blurring correction ratio of the body unit side, and the lens unit performs blurring correction on the basis of the blurring correction ratio of the lens unit side. As a result, it is possible to widen a blurring correction range of the camera system as a whole and improve blurring correction performance.

In the second technique (for example, Japanese Laid-open Patent Publication No. 2015-194687), both the image stabilization function of the lens unit and the image stabilization function of the body unit are operated. The image stabilization function of the body unit performs a shake correction operation depending on a camera shake amount detected by a gyro sensor. Meanwhile, the image stabilization function of the lens unit performs the shake correction operation for the correction amount not corrected by the shake correction operation of the image stabilization function of the body unit. As a result, a correction remainder for the camera shake correction is reduced.

SUMMARY

According to an aspect of this embodiment, there is provided an imaging apparatus including: an optical system configured to form a subject image; an image pickup element configured to capture a subject image formed on an imaging plane by the optical system; a shake detection sensor configured to detect a shake of the imaging apparatus, a microcomputer, a first blurring correction actuator, and a second blurring correction actuator. The microcomputer is configured to perform computation for a blurring amount calculation section, a correction amount calculation section, a subtraction amount determination section, and a subtraction section. The blurring amount calculation section calculates a blurring amount of the subject image formed on the imaging plane on the basis of a detection result of the shake detection sensor. The correction amount calculation section calculates a correction amount for canceling blurring of the subject image formed on the imaging plane on the basis of the blurring amount. The subtraction amount determination section determines a subtraction amount per predetermined period of time for a correction amount or a blurring amount per predetermined period of time. The subtraction section subtracts a subtraction amount per one correction cycle based on the subtraction amount per predetermined period of time from the correction amount or the blurring amount. The first blurring correction actuator is configured to shift a part of the optical system on a plane orthogonal to an optical axis of the optical system in a direction to cancel blurring of the subject image formed on the imaging plane on the basis of any one of a subtraction result of the subtraction section and the subtraction amount per one correction cycle. The second blurring correction actuator is configured to shift the image pickup element on the plane orthogonal to the optical axis of the optical system in a direction to cancel blurring of the subject image formed on the imaging plane on the basis of another of a subtraction result of the subtraction section and the subtraction amount per one correction cycle.

According to another aspect of this embodiment, there is provided a shake correction method executed in an imaging apparatus having an optical system that forms a subject image and an image pickup element that captures a subject image formed on an imaging plane by the optical system, the shake correction method including: detecting a shake of the imaging apparatus; calculating a blurring amount in a subject image formed on the imaging plane on the basis of a result of the detection; calculating a correction amount for canceling blurring of the subject image formed on the imaging plane on the basis of the blurring amount; determining a subtraction amount per predetermined period of time for a blurring amount or a correction amount per predetermined period of time; subtracting a subtraction amount per one correction cycle based on the subtraction amount per predetermined period of time from the blurring amount or the correction amount; shifting a part of the optical system on a plane orthogonal to an optical axis of the optical system in a direction to cancel blurring of the subject image formed on the imaging plane on the basis of any one of a result of the subtraction and the subtraction amount per one correction cycle; and shifting the image pickup element on the plane orthogonal to the optical axis of the optical system in a direction to cancel blurring of the subject image formed on the imaging plane on the basis of another of a result of the subtraction and the subtraction amount per one correction cycle.

According to further another aspect of this embodiment, there is provided a lens unit configured to be detachably installed in a body unit having an image pickup element that captures a subject image formed on an imaging plane using an optical system and a first blurring correction actuator that shifts the image pickup element on a plane orthogonal to an optical axis of the optical system in a direction to cancel blurring of a subject image formed on the imaging plane on the basis of a first correction amount, the lens unit including: the optical system configured to form a subject image; a shake detection sensor configured to detect a shake in the lens unit; a lens controller, and a second blurring correction actuator. The lens controller is configured to perform computation for each of a blurring amount calculation section, a correction amount calculation section, a communication section, and a subtraction section. The blurring amount calculation section calculates a blurring amount of the subject image formed on the imaging plane on the basis of a detection result of the shake detection sensor. The correction amount calculation section calculates a second correction amount for canceling blurring of the subject image formed on the imaging plane on the basis of the blurring amount. The communication section transmits the second correction amount calculated by the correction amount calculation section to the body unit at a predetermined timing and receives, from the body unit, a subtraction amount per one correction cycle as the first correction amount determined by the body unit on the basis of the second correction amount. The subtraction section subtracts the subtraction amount per one correction cycle from the second correction amount. The second blurring correction actuator is configured to shift a part of the optical system on the plane orthogonal to the optical axis of the optical system in a direction to cancel blurring of the subject image formed on the imaging plane on the basis of a result of the subtraction of the subtraction section.

According to still another aspect of this embodiment, there is provided a body unit in which a lens unit is configured to be detachably installed, the lens unit having an optical system that forms a subject image and a first blurring correction actuator for shifting a part of the optical system on a plane orthogonal to an optical axis of the optical system in a direction to cancel blurring of the subject image formed by the optical system on an imaging plane on the basis of a first correction amount, the body unit including: an image pickup element configured to capture the subject image formed on the imaging plane by the optical system; a shake detection sensor configured to detect a shake of the body unit; a microcomputer; a second blurring correction actuator; and a body controller. The microcomputer is configured to perform computation for each of a blurring amount calculation section, a correction amount calculation section, a subtraction amount determination section, and a subtraction section. The blurring amount calculation section calculates a blurring amount of the subject image formed on the imaging plane on the basis of a detection result of the shake detection sensor. The correction amount calculation section calculates a second correction amount for canceling blurring of the subject image formed on the imaging plane on the basis of the blurring amount. The subtraction amount determination section determines a subtraction amount per predetermined period of time for a second correction amount per predetermined period of time. The subtraction section subtracts a subtraction amount per one correction cycle based on the subtraction amount per predetermined period of time from the second correction amount. The second blurring correction actuator is configured to shift the image pickup element on the plane orthogonal to the optical axis of the optical system in a direction to cancel blurring of the subject image formed on the imaging plane on the basis of a subtraction result of the subtraction section. The body controller has a communication section configured to transmit the subtraction amount per predetermined period of time used in determination of the first correction amount to the lens unit.

BRIEF DESCRIPTION OF DRAWINGS

FIG. 16 is a diagram illustrating an exemplary functional configuration of an LCU according to the fourth embodiment;

DESCRIPTION OF EMBODIMENTS

Embodiments will now be described with reference to the accompanying drawings.

In the prior art, in a case where the shake correction means mounted in both the lens unit and the body unit are used in combination, and there is a difference in performance between both the shake correction means, the shake correction performance may be degraded by the shake correction caused by the shake correction means having inferior performance in some cases.

Specifically, three factors are known as factors of determining the shake correction performance, that is, (1) responsiveness, (2) detection accuracy, and (3) correction range.

(1) The responsiveness refers to a delay time until shake correction is performed in response to detection of a camera shake. (2) The detection accuracy refers to accuracy in a case where a shake of the camera is detected as an angular velocity. (3) The correction range refers to a changeable range of a positional relationship between the subject image and the image pickup element, and also refers to a maximum movable range of the subject image with respect to the image pickup element.

The shake correction performance is determined depending on the lowest performance factor out of the three factors (1) to (3). For example, in a case where the (1) responsiveness is a limitation of the shake correction performance, it is difficult to improve the shake correction performance even by increasing the (2) correction range.

In the following embodiments, in view of the aforementioned fact, an imaging apparatus, a shake correction method, a lens unit, and a body unit are provided, by which it is possible to widen a correction range of the shake correction without degrading the shake correction performance even when there is a difference in performance of the shake correction means mounted in both the lens unit and the body unit.

First Embodiment

In a camera as an imaging apparatus according to a first embodiment, both the lens unit and the body unit have the image stabilization functions. The image stabilization function of the lens unit has higher performance than that of the body unit. In this camera, the lens unit having higher shake correction performance performs a main shake correction operation, and the body unit performs a subsidiary shake correction operation as described below in more details.

Figure 1:
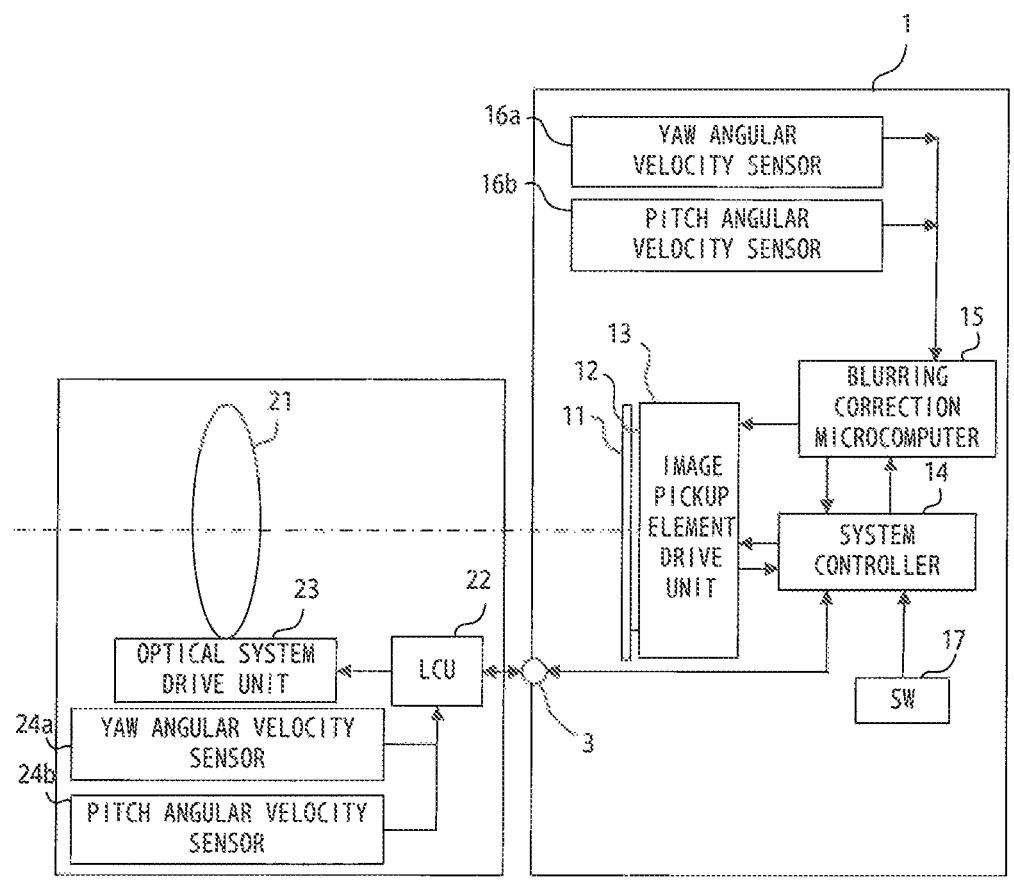
FIG. 1 is a diagram illustrating an exemplary configuration of a camera as an imaging apparatus according to a first embodiment.

FIG. 1 is a diagram illustrating an exemplary configuration of a camera as an imaging apparatus according to the first embodiment.

Note that FIG. 1 only illustrates main parts relating to shake correction, and other components are not illustrated for simplicity purposes.

As illustrated in FIG. 1, the camera according to this embodiment has a configuration in which the lens unit 2 is installed in the body unit 1. The lens unit 2 is detachably installed in the body unit 1, and the installation of the lens unit 2 is performed by fitting a body-side mount portion (not shown) provided in the body unit 1 and a lens-side mount portion (not shown) provided in the lens unit 2 to each other. As a result, the lens unit 2 is fixed to the body unit 1, and the lens unit 2 and the body unit 1 are electrically connected to each other via a mount contact point 3, so as to enable communication between the lens unit 2 and the body unit 1.

The lens unit 2 includes an optical system 21, a lens control unit (LCU) 22, an optical system drive unit 23, and a pair of angular velocity sensors 24 (including a Yaw angular velocity sensor 24a and a Pitch angular velocity sensor 24b).

The optical system 21 forms a subject image as an optical image of a subject on an imaging plane of the image pickup element 12. In FIG. 1, for convenient description purposes, the optical system 21 is illustrated in a simplified configuration. However, in practice, the optical system 21 has a plurality of lenses such as a focus lens, a zoom lens, and a blurring correction lens.

The optical system drive unit 23 shifts the lenses included in the optical system 21 under control of the LCU 22. For example, the optical system drive unit 23 shifts the blurring correction lens on a plane orthogonal to an optical axis of the optical system 21. The optical system drive unit 23 includes, for example, a step motor and a motor driver (motor drive circuit). The optical system drive unit 23 is an example of the first blurring correction actuator.

The Yaw angular velocity sensor 24a detects a rotational angular velocity around a vertical axis of the lens unit 2 (in a Yaw direction). The Pitch angular velocity sensor 24b detects a rotational angular velocity around a horizontal axis of the lens unit 2 (in a Pitch direction).

The LCU 22 controls whole operations of the lens unit 2 under control of a system controller 14 via communication with the system controller 14. For example, the LCU 22 performs a focus control, a control of an aperture (not shown), a shake correction control, and the like. In the shake correction control, the optical system drive unit 23 is controlled to shift the blurring correction lens in a direction to cancel blurring on a subject image formed on the imaging plane. The LCU 22 is an example of the lens controller.

The body unit 1 has a shutter 11, an image pickup element 12, an image pickup element drive unit 13, a system controller 14, a blurring correction microcomputer 15, a pair of angular velocity sensors 16 (Yaw angular velocity sensor 16a and Pitch angular velocity sensor 16b), and a switch (SW) 17.

The shutter 11 performs an open/close operation to switch the imaging plane of the image pickup element 12 into an exposure state or a blocking state. The shutter 11 is, for example, a focal plane shutter.

The image pickup element 12 converts a subject image formed on the imaging plane by the optical system 21 into an electric signal. That is, the image pickup element 12 captures the subject image. The image pickup element 12 is an image sensor such as a charge coupled device (CCD) or a complementary metal oxide semiconductor (CMOS).

The image pickup element drive unit 13 shifts the image pickup element 12 on a plane orthogonal to the optical axis of the optical system. 21 under control of the blurring correction microcomputer 15. The image pickup element drive unit 13 has, for example, a plurality of actuators (such as a voice coil motor (VCM)). The image pickup element drive unit 13 is an example of the second blurring correction actuator.

The Yaw angular velocity sensor 16a detects a rotational angular velocity around the vertical axis of the body unit 1 (in the Yaw direction). The Pitch angular velocity sensor 16b detects a rotational angular velocity around a horizontal axis of the body unit 1 (in the Pitch direction).

Here, a set of the Yaw angular velocity sensor 24a and the Pitch angular velocity sensor 24b of the lens unit 2 and/or a set of the Yaw angular velocity sensor 16a and the Pitch angular velocity sensor 16b of the body unit 1 are examples of the shake detection sensors.

The blurring correction microcomputer 15 performs a shake correction control under control of the system controller 14 via communication with the system controller 14. In the shake correction control, the image pickup element drive unit 13 is controlled to shift the image pickup element 12 in a direction to cancel blurring of the subject image formed on the imaging plane.

The SW 17 detects various operations from a user, such as a release operation or a menu operation, and notifies it to the system controller 14.

The system controller 14 performs communication with the LCU 22 and the blurring correction microcomputer 15 to control whole operations of the camera (including the body unit 1 and the lens unit 2).

In the camera having such a configuration, each of the functions of the system controller 14, the blurring correction microcomputer 15, and the LCU 22 has, for example, a processor (such as a central processing unit (CPU)) and a memory, and is implemented by causing the processor to execute the program recorded in the memory. Alternatively, each of the system controller 14, the blurring correction microcomputer 15, and the LCU 22 may be implemented by a dedicated circuit such as an application specific integrated circuit (ASIC) or a field-programmable gate array (FPGA).

Here, the system controller 14 is an example of the body controller. In addition, the blurring correction microcomputer 15 is an example of the microcomputer.

Figure 2:
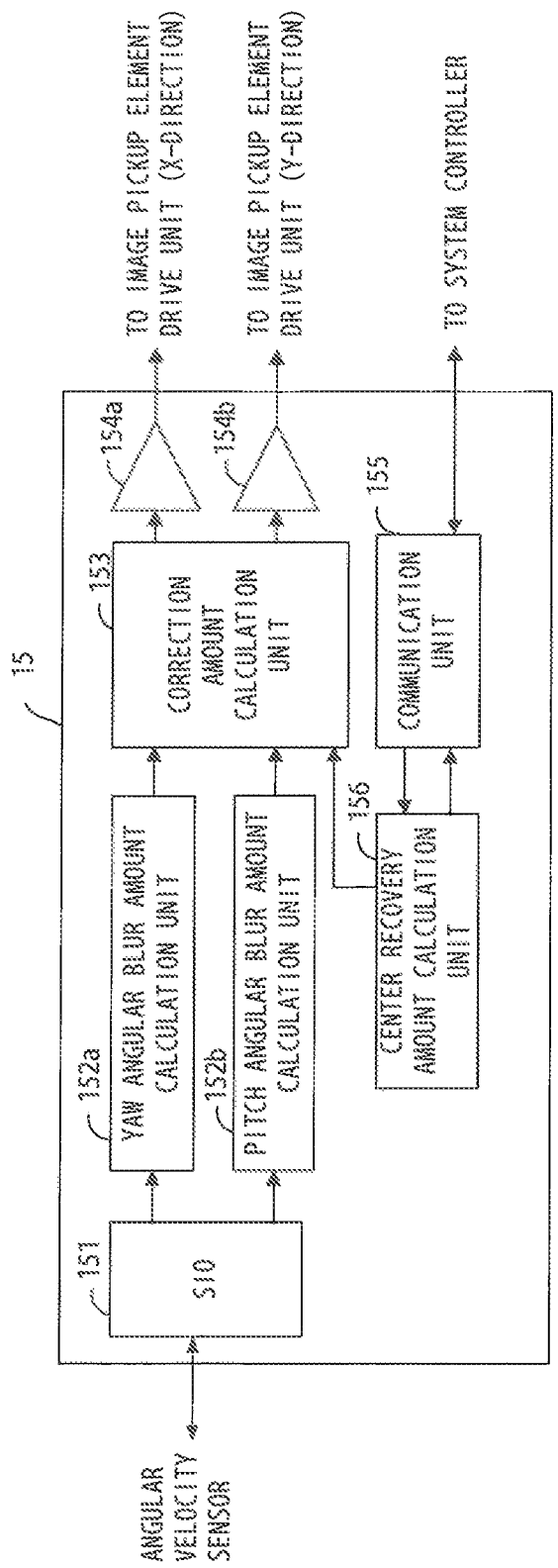
FIG. 2 is a diagram illustrating an exemplary functional configuration of a blurring correction microcomputer according to the first embodiment.

FIG. 2 is a diagram illustrating an exemplary functional configuration of the blurring correction microcomputer 15.

As illustrated in FIG. 2, the blurring correction microcomputer 15 includes a serial input/output (SIO) 151, a pair of angular blur amount calculation units 152 (Yaw angular blur amount calculation unit 152a and Pitch angular blur amount calculation unit 152b), a correction amount calculation unit 153, a pair of drivers 154 (154a and 154b), a communication unit 155, and a center recovery amount calculation unit 156.

The SIO 151 is a clock-synchronized serial communication interface. The SIO 151 sequentially reads digital values regarding the angular velocity detected by each angular velocity sensor 16 from the Yaw angular velocity sensor 16a and the Pitch angular velocity sensor 16b on the basis of a predetermined protocol.

The Yaw angular blur amount calculation unit 152a integrates the angular velocity detected by the Yaw angular velocity sensor 16a to calculate an angular change amount, and multiples this angular change amount by a focal length of the optical system 21 to calculate an image shift amount (also referred to as "image blurring amount" or simply referred to as "blurring amount") of an X-direction (horizontal direction of the body unit 1) generated on the imaging plane of the image pickup element 12.

The Pitch angular blur amount calculation unit 152b integrates the angular velocity detected by the Pitch angular velocity sensor 16b to calculate an angular change amount, and multiplies this angular change amount by the focal length of the optical system 21 to calculate an image shift amount of the Y-direction (vertical direction of the body unit 1) generated on the imaging plane of the image pickup element 12.

The correction amount calculation unit 153 calculates an X-directional correction amount for canceling an X-directional image shift amount calculated by the Yaw angular blur amount calculation unit 152a. In addition, the correction amount calculation unit 153 calculates a Y-directional correction amount for canceling a Y-directional image shift amount calculated by the Pitch angular blur amount calculation unit 152b.

The correction amount calculation unit 153 may integrate the X-directional and Y-directional center recovery amounts calculated by a center recovery amount calculation unit 156 to calculate the X-directional and Y-directional correction amounts in some cases.

The driver 154a converts the X-directional correction amount calculated by the correction amount calculation unit 153 into a drive pulse signal for allowing the image pickup element drive unit 13 to shift the image pickup element 12 in the X-direction and outputs the drive pulse signal to the image pickup element drive unit 13.

The driver 154b converts the Y-directional correction amount calculated by the correction amount calculation unit 153 into a drive pulse signal for allowing the image pickup element drive unit 13 to shift the image pickup element 12 in the Y-direction, and outputs the drive pulse signal to the image pickup element drive unit 13.

The communication unit 155 performs communication with the system controller 14. For example, the communication unit 155 receives an instruction relating to shake correction from the system controller 14. In addition, as the X-directional and Y-directional correction amounts transmitted from the LCU 22 via the system controller 14 are received, the communication unit 155 notifies them to the center recovery amount calculation unit 156. Furthermore, the communication unit 155 transmits the X-directional and Y-directional center recovery amounts calculated by the center recovery amount calculation unit 156 to the LCU 22 via the system controller 14.

The center recovery amount calculation unit 156 calculates the X-directional and Y-directional center recovery amounts on the basis of the X-directional and Y-directional correction amounts from the LCU 22, notified from the communication unit 155.

According to this embodiment, the X-directional and Y-directional correction amounts from the LCU 22 are regarded as X-directional and Y-directional correction amounts calculated by the LCU 22 at an exposure start timing for static image shooting. In addition, the center recovery amount calculation unit 156 calculates X-directional and Y-directional correction amounts per one blurring correction control cycle by dividing each of the X-directional and Y-directional correction amounts by the number of blurring correction control cycles during an exposure period of the static image shooting, and sets these X-directional and Y-directional correction amounts per one blurring correction control cycle as the X-directional and Y-directional center recovery amounts. Note that the center recovery amount calculation unit 156 determines the X-directional and Y-directional correction amounts from the LCU 22 as the center recovery amount which is the subtraction amount per exposure period.

In the following description, the blurring correction control cycle will be simply referred to as "correction cycle".

Figure 3:
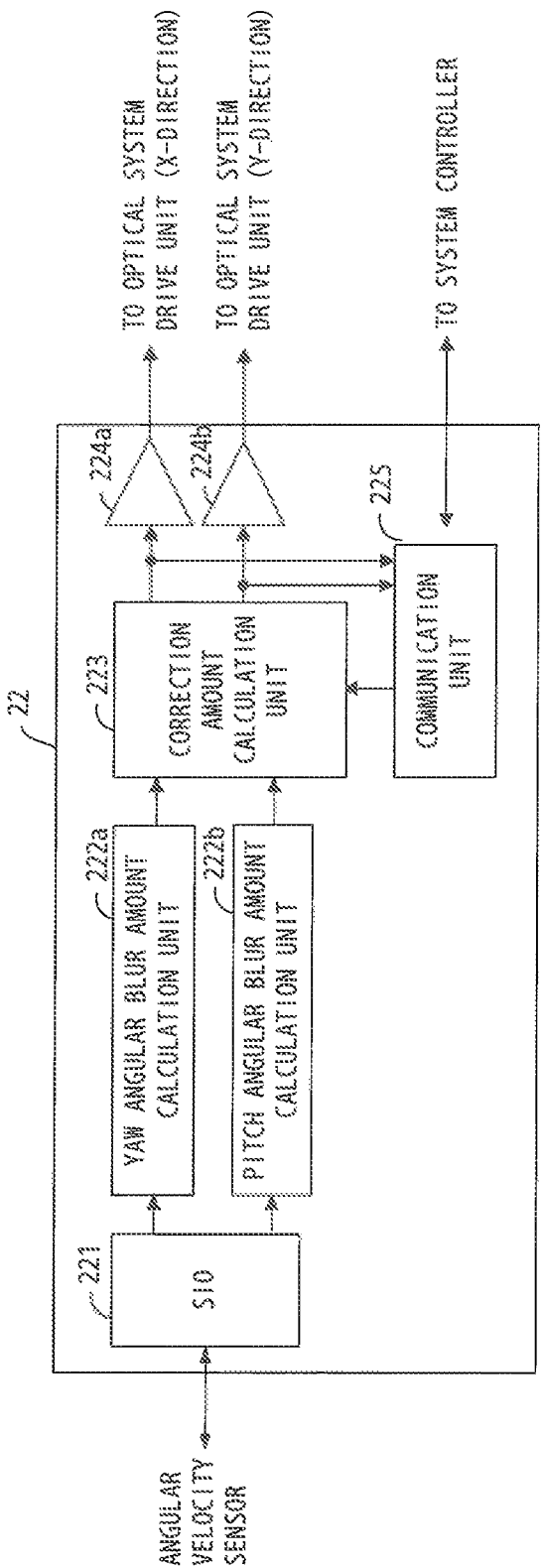
FIG. 3 is a diagram illustrating an exemplary functional configuration of an LCU according to the first embodiment.

FIG. 3 is a diagram illustrating an exemplary functional configuration of the LCU 22.

Note that, in FIG. 3, only main parts relating to shake correction are illustrated, and the other parts are not illustrated for simplicity purposes.

As illustrated in FIG. 3, the LCU 22 has an SIO 221, a pair of angular blur amount calculation units (Yaw angular blur amount calculation unit 222a and Pitch angular blur amount calculation unit 222b), a correction amount calculation unit 223, a pair of drivers 224 (224a and 224b), and a communication unit 225.

Similar to the SIO 151, the SIO 221 is a clock-synchronized serial communication interface. The SIO 221 sequentially reads digital values of the angular velocities detected by each angular velocity sensor 24 from the Yaw angular velocity sensor 24a and the Pitch angular velocity sensor 24b on the basis of a predetermined protocol.

Similar to the Yaw angular blur amount calculation unit 152a, the Yaw angular blur amount calculation unit 222a integrates the angular velocity detected by the Yaw angular velocity sensor 24a to calculate an angular change amount, and multiplies the angular change amount by the focal length of the optical system 21 to calculate the X-directional image shift amount generated on the imaging plane of the image pickup element 12.

Similar to the Pitch angular blur amount calculation unit 152b, the Pitch angular blur amount calculation unit 222b integrates the angular velocity detected by the Pitch angular velocity sensor 24b to calculate an angular change amount, and multiples the angular change amount by the focal length of the optical system 21 to calculate the Y-directional image shift amount generated on the imaging plane of the image pickup element 12.

Similar to the correction amount calculation unit 153, the correction amount calculation unit 223 calculates an X-directional correction amount for canceling the X-directional image shift amount calculated by the Yaw angular blur amount calculation unit 222a. In addition, the correction amount calculation unit 223 calculates a Y-directional correction amount for canceling the Y-directional image shift amount calculated by the Pitch angular blur amount calculation unit 222b.

The driver 224a converts the X-directional correction amount calculated by the correction amount calculation unit 223 into a drive pulse signal for allowing the optical system drive unit 23 to shift the blurring correction lens in the X-direction, and outputs the drive pulse signal to the optical system drive unit 23.

The driver 224b converts the Y-directional correction amount calculated by the correction amount calculation unit 223 into a drive pulse signal for allowing the optical system drive unit 23 to shift the blurring correction lens in the Y-direction, and outputs the drive pulse signal to the optical system drive unit 23.

The communication unit 225 performs communication with the system controller 14. For example, the communication unit 225 receives an instruction relating to a control of the lens unit 2 from the system controller 14, or performs communication relating to shake correction with the system controller 14.

According to this embodiment, the communication unit 225 answers the X-directional and Y-directional correction amounts calculated by the correction amount calculation unit 223 in response to a request from the system controller 14, receives the X-directional and Y-directional center recovery amounts transmitted from the system controller 14, and notifies X-directional and Y-directional center recovery amounts to the correction amount calculation unit 223. In this case, the correction amount calculation unit 223 calculates the X-directional and Y-directional correction amounts on the basis of the calculation results of a pair of angular blur amount calculation units 222, and subtracts the X-directional and Y-directional center recovery amounts notified from the communication unit 225 from the X-directional and Y-directional correction amounts.

Figure 4:
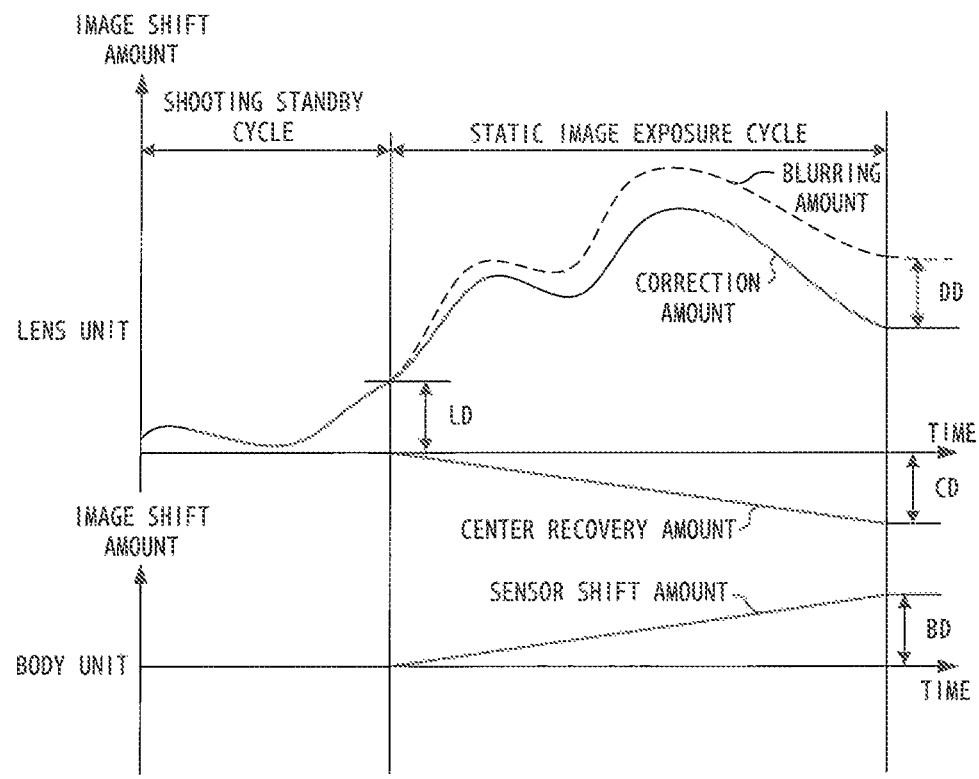
FIG. 4 is a timing chart illustrating an exemplary shake correction operation of a lens unit and a body unit according to the first embodiment.

FIG. 4 is a timing chart illustrating an exemplary shake correction operation in the lens unit 2 and the body unit 1.

Here, only the shake correction for one of the X-direction and the Y-direction will be described with reference to FIG. 4. Since the shake correction operation for the other direction is similar, it will not be described for simplicity purposes.

In FIG. 4, the ordinate refers to a value corresponding to the image shift amount on the imaging plane, and the horizontal refers to time.

As illustrated in FIG. 4, in a shooting standby state period (shooting standby period), a shake correction operation of the lens unit 2 is performed, and a shake correction operation of the body unit 1 is in a halt state.

In this case, as a user performs a release operation (static image shooting start instruction) for the SW 17, the system controller 14 acquires a correction amount LD from the lens unit 2 at this timing (exposure start timing).

In an exposure period from the exposure start to the end of the exposure of the static image shooting, a center recovery amount subtracted from the correction amount calculated by the lens unit 2 is set to "CD", and a shift amount of the image pickup element 12 is set to "BD". In addition, a difference between an actual blurring amount and the correction amount is set to "DD". Then, the shake correction operations of the lens unit 2 and the body unit 1 are performed to match all of "LD", "BD", "CD" and "DD".

Note that the center recovery amount CD is an amount for setting an image center deviation of the subject image formed on the imaging plane at the exposure start timing to zero during the exposure period.

The system controller 14 transmits the correction amount LD acquired from the lens unit 2 to the blurring correction microcomputer 15. The center recovery amount calculation unit 156 of the blurring correction microcomputer 15 calculates a center recovery amount ΔD which is a subtraction amount per one correction cycle on the basis of the correction amount LD and the exposure period. The calculated center recovery amount ΔD is notified to the correction amount calculation unit 153 and transmitted to the system controller 14.

The system controller 14 transmits the center recovery amount ΔD to the lens unit 2.

In the exposure period, in the lens unit 2, the correction amount calculation unit 223 subtracts the center recovery amount ΔD from the calculated correction amount. Meanwhile, in the body unit 1, the correction amount calculation unit 153 calculates the correction amount by integrating the center recovery amount ΔD of each correction cycle. In this case, the correction amount calculation unit 153 does not calculate the correction amount based on the calculated result of the angular blur amount calculation unit 152.

As the exposure period is terminated, correction amount calculation in the correction amount calculation units 153 and 223 during the aforementioned exposure period stops, and the process returns to an initial state as necessary.

Through such a shake correction operation, it is possible to suppress a maximum value of the correction amount of the lens unit 2 and secure a correction range equivalent to that of the start of the camera shake correction operation of the lens unit 2 while the shake correction lens is at the center position (the position when the optical system drive unit 23 is initialized).

Figure 5:
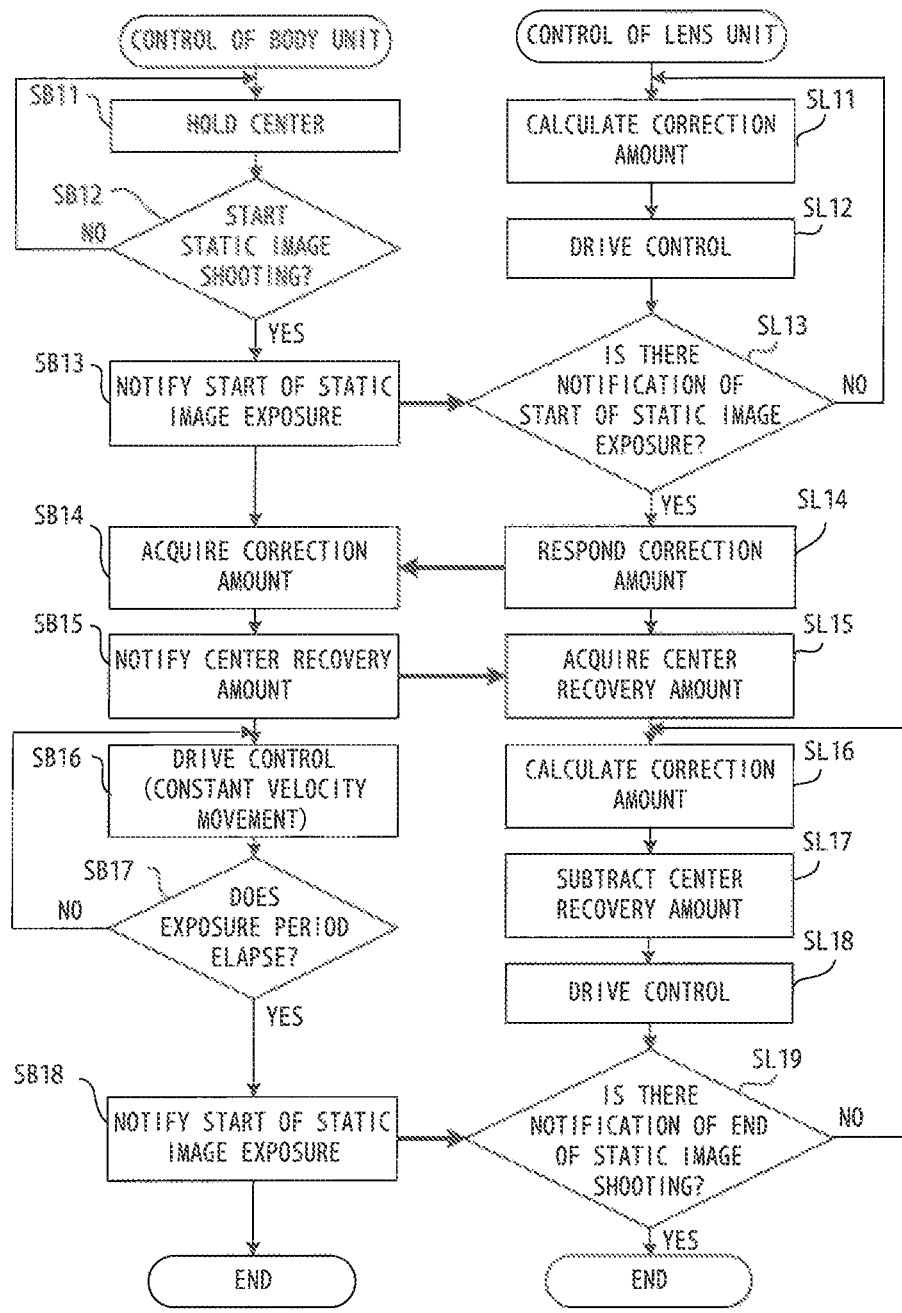
FIG. 5 is a flowchart illustrating an exemplary control relating to a shake correction operation of the lens unit and the body unit according to the first embodiment.

FIG. 5 is a flowchart illustrating an exemplary control relating to the shake correction operations of the lens unit 2 and the body unit 1.

Here, only a control relating to the shake correction operation for one of the X-direction and the Y-direction will be described. Since the control relating to the shake correction operation for the other direction is similar, it will not be described for simplicity purposes.

As illustrated in FIG. 5, the body unit 1 controls the image pickup element drive unit 13 such that the image pickup element 12 is maintained at the center position (the position when the image pickup element drive unit 13 is initialized) (SB11). In addition, it is determined whether or not the static image shooting start instruction is issued (whether or not detection of the release operation from the SW 17 is notified to the system controller 14) (SB12).

If a determination result of SB12 is "NO", the process returns to SB11. As a result, in the shooting standby state, the process SB11 is repeatedly performed.

Meanwhile, the lens unit 2 calculates the correction amount on the basis of the detection result of the angular velocity sensor 24 (SL11), performs a drive control of the optical system drive unit 23 so as to cancel blurring of the subject image formed on the imaging plane, and shifts the blurring correction lens (SL12). In addition, the lens unit 2 determines whether or not an exposure start of the static image shooting is notified from the body unit 1 (SL13).

If a determination result of SL13 is "NO", the process returns to SL11. As a result, in the shooting standby state, the processes SL11 and SL12 are repeatedly performed for each correction cycle.

Meanwhile, if the determination result of SB12 is "YES", the body unit 1 notifies an exposure start of the static image shooting (which also corresponds to a start of the static image shooting) to the lens unit 2 (SB13).

If the exposure start is notified, and the determination result of SL13 becomes "YES", the lens unit 2 replies the correction amount (LD) calculated by the correction amount calculation unit 223 at that timing to the lens unit 2 (SL14). This reply corresponds to the notification of SB13, and the notification of SB13 corresponds to the request.

As the correction amount (LD) is acquired (SB14), the body unit 1 calculates the center recovery amount (ΔD) per one correction cycle from the correction amount (LD) and the exposure period of the static image shooting, and notifies the center recovery amount (ΔD) to the lens unit 2 (SB15). The center recovery amount (ΔD) can be obtained by calculating "LD/N", where "N" denotes the number of correction cycles during the exposure period.

Then, the body unit 1 performs a drive control of the image pickup element drive unit 13 on the basis of the center recovery amount (ΔD) to shift the image pickup element 12 in a direction to cancel blurring of the subject image formed on the imaging plane (SB16).

Then, the body unit 1 determines whether or not the exposure period is terminated (SB17).

If the determination result of SB17 is "NO", the process returns to SB16. As a result, the process SB16 is repeatedly performed until the exposure period is terminated. That is, during the exposure period, a constant speed movement of the image pickup element 12 is performed such that the image pickup element 12 is shifted on the basis of the center recovery amount (ΔD) for each correction cycle.

Meanwhile, if the determination result of SB17 is "YES", the body unit 1 notifies termination of the exposure of the static image shooting to the lens unit 2 (SB18), so that the control relating to the shake correction operation of the body unit 1 is terminated.

Meanwhile, similar to SL11, as the center recovery amount (ΔD) is notified, the lens unit 2 calculates the correction amount (SL16), and subtracts the center recovery amount (ΔD) from the correction amount (SL17). In addition, the lens unit 2 performs a drive control of the optical system drive unit 23 on the basis of a result of the subtraction to shift the blurring correction lens in a direction to cancel blurring of the subject image formed on the imaging plane (SL18).

Then, the lens unit 2 determines whether or not termination of the exposure of the static image shooting is notified from the body unit 1 (SL19).

If the determination result of SL19 is "NO", the process returns to SL16. As a result, the processes SL16 to SL18 are repeatedly performed until the termination of the exposure of the static image shooting is notified (that is, during the exposure period).

Meanwhile, if the determination result of SL19 is "YES", the control relating to the shake correction operation of the lens unit 2 is terminated.

As described above, according to the first embodiment, the shake correction operation is performed by the lens unit 2 having an image stabilization function having higher performance than that of the body unit 1 in the shooting standby state. As the static image shooting starts (as the exposure period starts), the lens unit 2 calculates the center recovery amount (ΔD) per one correction cycle on the basis of the correction amount (LD) calculated by the lens unit 2 at the start timing. In addition, in the exposure period, the lens unit 2 performs a shake correction operation on the basis of the result of subtracting the center recovery amount (ΔD) from the calculated correction amount, and the body unit 1 performs a shake correction operation (constant speed movement of the image pickup element 12) for compensating for the subtraction amount (shake correction shortage). Therefore, it is possible to maintain shake correction performance of the lens unit 2 and secure a correction range equivalent to that of the start of the shake correction while the blurring correction lens is at the center position as a shake correction range of the lens unit 2. Therefore, it is possible to improve the shake correction performance.

Note that, in this embodiment, calculation of the center recovery amount (ΔD) is performed by the blurring correction microcomputer 15. Alternatively, without limiting thereto, the calculation may be performed by the system controller 14 and may be notified to the blurring correction microcomputer 15 and the LCU 22.

Second Embodiment

Next, a second embodiment will be described. In this description, only parts different from those of the first embodiment will be described. In addition, like reference numerals denote like elements as in the first embodiment, and they will not be described repeatedly.

According to the second embodiment, assuming that the image stabilization function of the body unit 1 has higher performance than that of the lens unit 2, the body unit 1 having image stabilization function of higher performance performs a main shake correction operation, and the lens unit 2 performs a subsidiary shake correction operation as described below in more details. In addition, although it is assumed that such shake correction operations are performed during the moving image shooting in the second embodiment, such shake correction operations may also be performed during a live view display.

Figure 6:
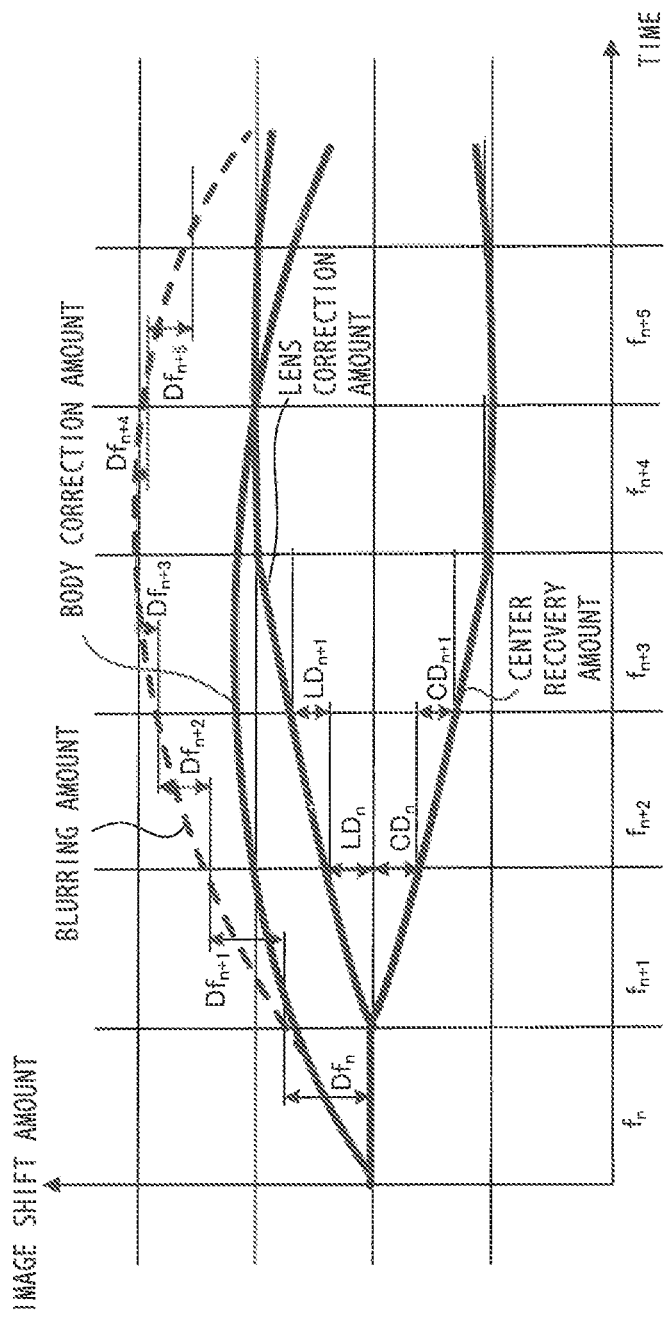
FIG. 6 is a timing chart illustrating an exemplary shake correction operation of the lens unit and the body unit during moving image shooting according to a second embodiment.

FIG. 6 is a timing chart illustrating exemplary shake correction operations of the lens unit 2 and the body unit 1 during the moving image shooting according to the second embodiment.

Here, only a shake correction operation for one of the X-direction and the Y-direction will be described with reference to FIG. 6. Since the shake correction operation for the other direction is similar, it will not be described repeatedly.

In FIG. 6, the ordinate refers to a value corresponding to the image shift amount on the imaging plane, and the horizontal refers to time. A scale division (one square) on the horizontal indicates a control cycle (hereinafter, referred to as "lens control cycle") for which the body unit 1 (system controller 14) controls the lens unit 2. Note that the lens control cycle is also a focus control cycle of the optical system 21. In addition, the lens control cycle may be set to the same value as a frame rate of the moving image shooting or a frame rate of the live view display.

For example, in a case where the lens control cycle is set to "25 Hz", and the correction cycle is set to "1 KHz", the blurring correction control is performed forty times per one lens control cycle.

As illustrated in FIG. 6, assuming that a blurring amount for a lens control cycle $f_n$ is denoted by "$Df_n$", a center recovery amount $CD_n$, which is a subtraction amount for the next lens control cycle $f_{n+1}$, is calculated by multiplying the blurring amount by a correction coefficient α (where "α" is set to 0 to 1).

Assuming that "k" denotes frequency of the blurring correction control per one lens control cycle, an expression "$CD_n/k$" indicates the center recovery amount ΔD, which is a subtraction amount subtracted from the blurring amount per one correction cycle, in a lens control cycle $f_{n+1}$. Therefore, the body unit 1 performs a shake correction operation by setting a value based on the value obtained by subtracting the center recovery amount ΔD from the blurring amount as the correction amount. Meanwhile, in order to allow the lens unit 2 to compensate for the subtraction amount (the amount of shake correction shortage) per lens control period $f_{n-f}$ the body unit 1 notifies the lens unit 2 of the center recovery amount $CD_n$, which is the subtraction amount per lens control period $f_{n+1}$, as the lens correction amount $LD_n$.

The lens unit 2 divides the notified lens correction amount $LD_n$ by blurring correction control frequency per one lens control cycle, and shifts the blurring correction lens by setting a value based on the result of the division as a correction amount for one shake correction control (per one correction cycle) of the lens control cycle $f_{n+1}$.

By repeating this operation, it is possible to suppress a maximum correction amount of the body unit 1. Therefore, it is possible to correct a shake having a large amplitude.

Note that the correction coefficient α may be obtained as a ratio of the shake correction range between the body unit 1 and the lens unit 2 or may be set to simply "1:1". This ratio may be adaptively changed such that a change amount during the lens control cycle (the change amount of the center recovery amount CD) is reduced.

Figure 7:
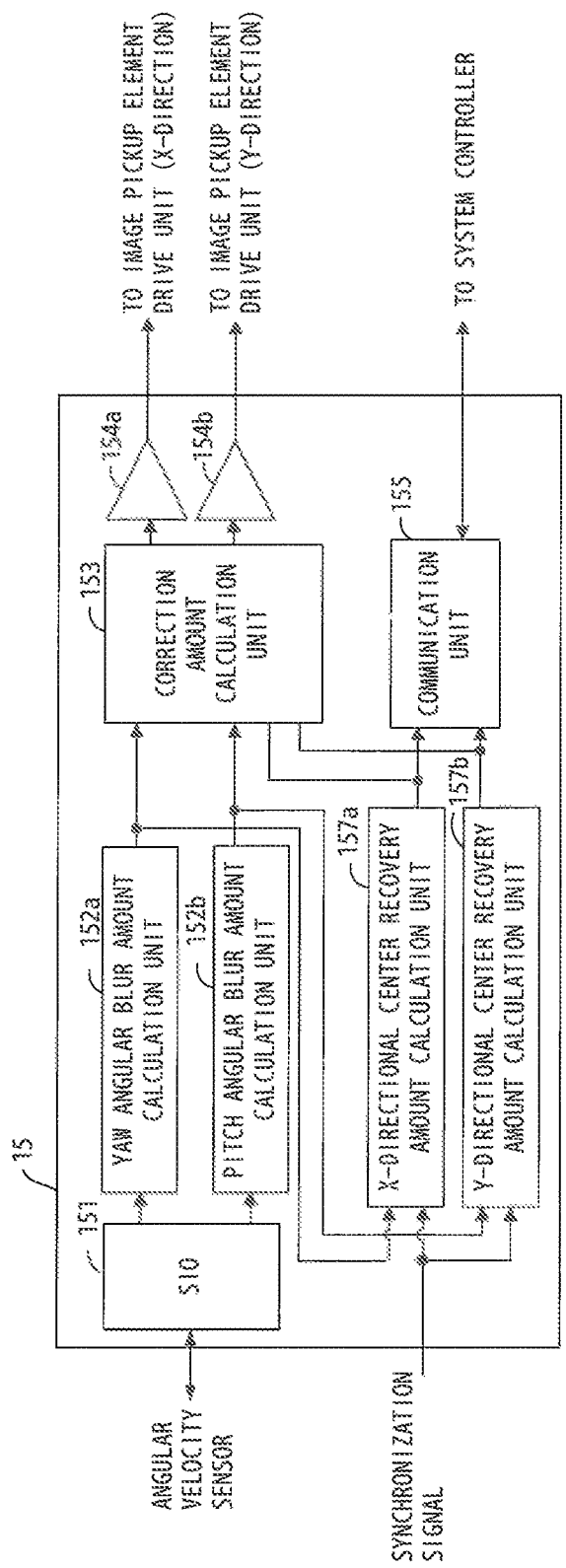
FIG. 7 is a diagram illustrating an exemplary functional configuration of a blurring correction microcomputer according to the second embodiment.

FIG. 7 is a diagram illustrating an exemplary functional configuration of the blurring correction microcomputer 15 according to the second embodiment.

As illustrated in FIG. 7, the blurring correction microcomputer 15 according to the second embodiment has a pair of center recovery amount calculation units 157 (X-center recovery amount calculation unit 157a and Y-center recovery amount calculation unit 157b) instead of the center recovery amount calculation unit 156 (refer to FIG. 2).

The X-center recovery amount calculation unit 157a calculates an X-directional image shift amount (Df) of each lens control cycle depending on the X-directional image shift amount calculated by the Yaw angular blur amount calculation unit 152a and the synchronization signal synchronized with the lens control cycle from the system controller 14. In addition, the X-center recovery amount calculation unit 157a sets a value obtained by multiplying the calculated X-directional image shift amount (Df) by the correction coefficient α as a center recovery amount (CD) which is an X-directional subtraction amount of the next lens control cycle. This center recovery amount (CD) is notified as the X-directional lens correction amount (LD) from the communication unit 155 to the LCU 22 via the system controller. In addition, the X-center recovery amount calculation unit 157a calculates a subtraction amount (center recovery amount ΔD) subtracted from the X-directional correction amount per one correction cycle by dividing the X-directional center recovery amount (CD) by the blurring correction control frequency per one lens control cycle, and notifies the subtraction amount to the correction amount calculation unit 153.

Similar to the X-center recovery amount calculation unit 157a, the Y-center recovery amount calculation unit 157b calculates a Y-directional image shift amount (Df) of each lens control cycle depending on the Y-directional image shift amount calculated by the Pitch angular blur amount calculation unit 152b and the synchronization signal synchronized with the lens control cycle from the system controller 14. In addition, the Y-center recovery amount calculation unit 157b sets a value obtained by multiplying the calculated Y-directional image shift amount (Df) by the correction coefficient α as the center recovery amount (CD) which is the Y-directional subtraction amount of the next lens control cycle. This center recovery amount (CD) is notified as the Y-directional lens correction amount (LD) from the communication unit 155 to the LCU 22 via the system controller. In addition, the Y-center recovery amount calculation unit 157b calculates a subtraction amount (center recovery amount ΔD) subtracted from the Y-directional correction amount per one correction cycle by dividing the Y-directional center recovery amount (CD) by the blurring correction control frequency per one lens control cycle, and notifies the subtraction amount to the correction amount calculation unit 153.

The correction amount calculation unit 153 calculates the X-directional correction amount on the basis of a result of subtracting the X-directional subtraction amount per one correction cycle notified from the X-center recovery amount calculation unit 157a from the X-directional image blurring amount calculated by the Yaw angular blur amount calculation unit 152a. In addition, the correction amount calculation unit 153 calculates the Y-directional correction amount on the basis of a result of the subtracting the Y-directional subtraction amount per one correction cycle notified from the Y-center recovery amount calculation unit 157b from the Y-directional image blurring amount calculated by the Pitch angular blur amount calculation unit 152b.

In FIG. 7, other functional configurations of the blurring correction microcomputer 15 are similar to those of the first embodiment.

Figure 8:
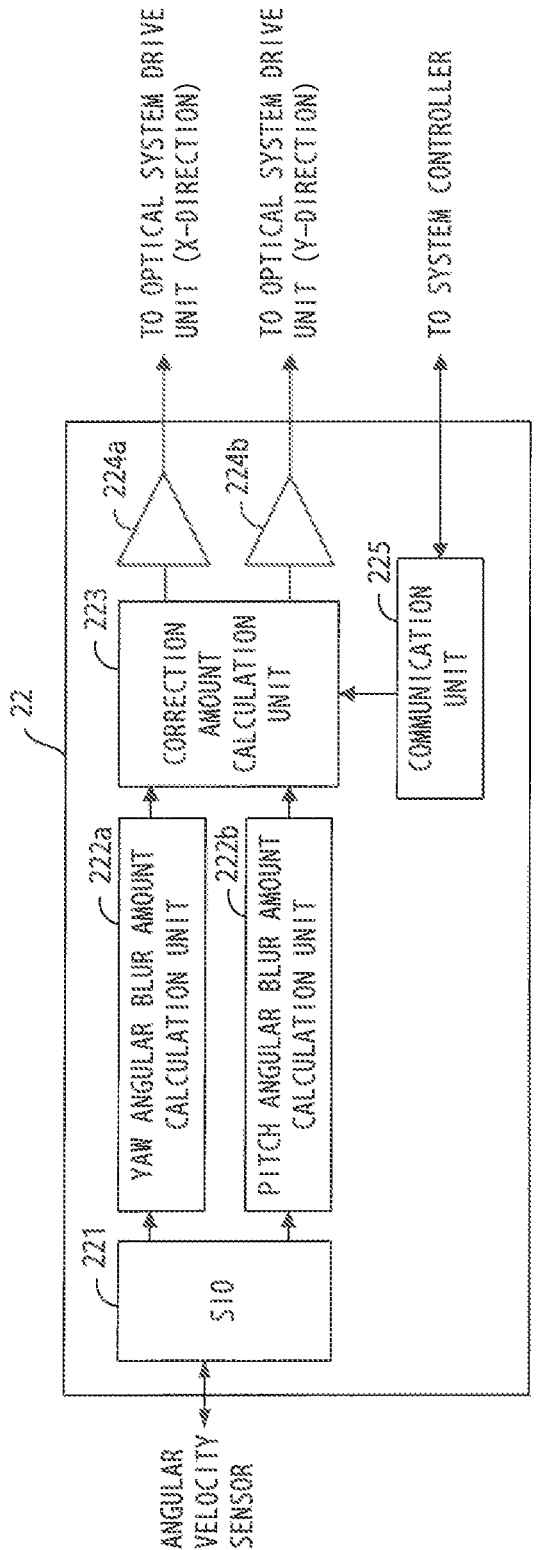
FIG. 8 is a diagram illustrating an exemplary functional configuration of an LCU according to the second embodiment.

FIG. 8 is a diagram illustrating an exemplary functional configuration of the LCU 22 according to the second embodiment.

In the LCU 22 according to the second embodiment, the X-directional image blurring amount calculated by the Yaw angular blur amount calculation unit 222a and the Y-directional image blurring amount calculated by the Pitch angular blur amount calculation unit 222b are not used by the correction amount calculation unit 223. In addition, the X-directional and Y-directional correction amounts calculated by the correction amount calculation unit 223 are not notified to the system controller 14.

In the LCU 22 according to the second embodiment, the X-directional and Y-directional lens correction amounts (LD) are notified from the blurring correction microcomputer 15 to the correction amount calculation unit 223 via the system controller 14 and the communication unit 225.

The correction amount calculation unit 223 divides each of the notified X-directional and Y-directional lens correction amounts (LD) by the blurring correction control frequency per lens control cycle and further divides each of them by a shake correction sensitivity coefficient β to calculate the X-directional and Y-directional correction amounts per one correction cycle output to a pair of drivers 224. Note that the shake correction sensitivity coefficient β refers to a ratio of the image shift amount on the imaging plane of the image pickup element 12 with respect to the shift amount of the blurring correction lens.

In FIG. 8, other functional configurations of the LCU 22 are similar to those of the first embodiment.

Next, an exemplary control relating to the shake correction operations of the lens unit 2 and the body unit 1 according to the second embodiment will be described with reference to FIGS. 9 and 10.

Here, only a control relating to the shake correction operation for one of the X-direction and the Y-direction will be described with reference to FIGS. 9 and 10. Since the control relating to the shake correction operation for the other direction is similar, it will not be described repeatedly.

Figure 9:
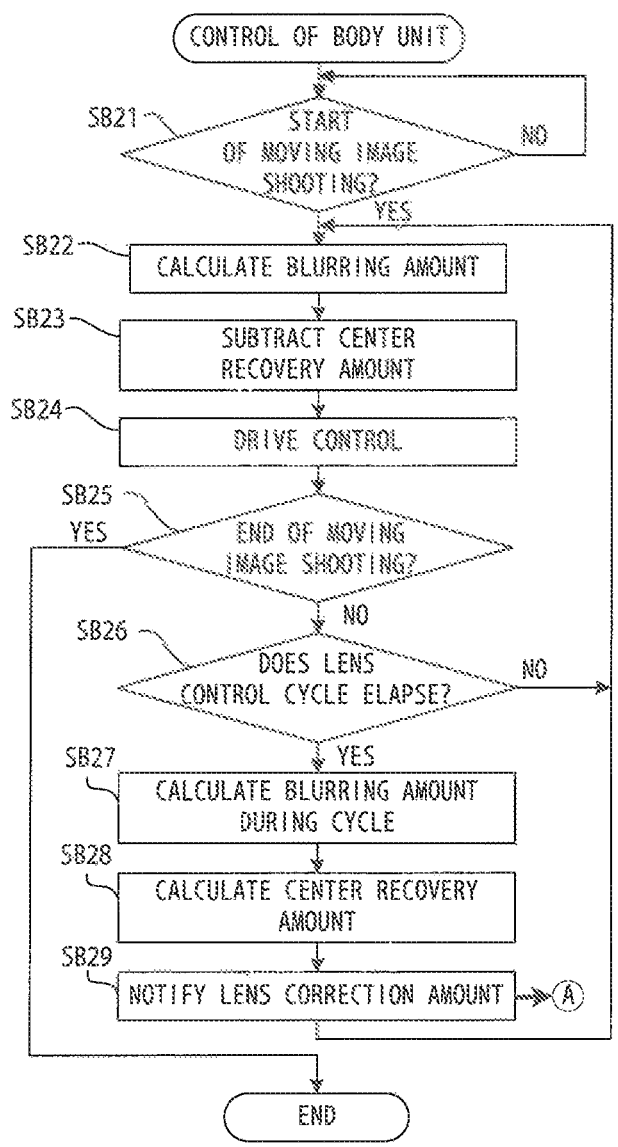
FIG. 9 is a flowchart illustrating an exemplary control relating to a shake correction operation of the body unit according to the second embodiment.

FIG. 9 is a flowchart illustrating an exemplary control relating to the shake correction operation of the body unit 1.

As illustrated in FIG. 9, the body unit 1 determines whether or not a moving image shooting start instruction is issued (whether or not operation detection for the moving image shooting start instruction is notified from the SW 17 to the system controller 14) (SB21).

If the determination result of SB21 is "NO", this determination is repeated.

Meanwhile, if the determination result of SB21 is "YES", the body unit 1 calculates the image blurring amount on the basis of the detection result of the angular velocity sensor 16 (SB22). In this case, in a case where there is a center recovery amount (CD), the correction amount is calculated on the basis of a result of subtracting the subtraction amount (center recovery amount ΔD) per one correction cycle based on the center recovery amount (CD) from the calculated image blurring amount (SB23). Note that, according to this embodiment, since the center recovery amount (CD) is calculated on the basis of a processing result of the previous lens control cycle, the center recovery amount (CD) does not exist in the first lens control cycle.

Then, the body unit 1 performs a drive control of the image pickup element drive unit 13 on the basis of the calculated correction amount and shifts the image pickup element 12 in a direction to cancel blurring of a subject image formed on the imaging plane (SB24).

Then, the body unit 1 determines whether or not a moving image shooting termination instruction is issued (whether or not operation detection of a moving image shooting termination instruction is notified from the SW 17 to the system controller 14) (SB25).

If the determination result of SB25 is "YES", a control relating to the shake correction operation of the body unit 1 is terminated.

Meanwhile, if the determination result of SB25 is "NO", the body unit 1 determines whether or not one lens control cycle elapses (SB26).

If the determination result of SB26 is "NO", the process returns to SB22.

Meanwhile, if the determination result of SB26 is "YES", the body unit 1 calculates the image blurring amount (Df) of one lens control cycle (SB27), and multiplies the image blurring amount (Df) by the correction coefficient α to calculate the center recovery amount (CD) of the next lens control cycle (SB28).

Then, the body unit 1 notifies the calculated center recovery amount (CD) to the lens unit 2 as the lens correction amount (LD) (SB29), and the process returns to SB22.

Figure 10:
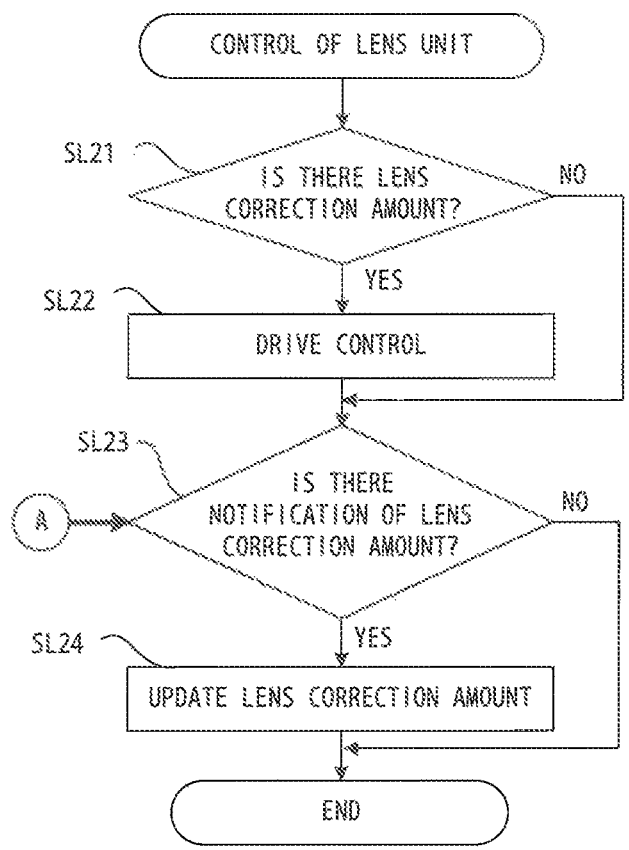
FIG. 10 is a flowchart illustrating an exemplary control relating to a shake correction operation of the lens unit according to the second embodiment.

FIG. 10 is a flowchart illustrating an exemplary control relating to the shake correction operation of the lens unit 2. Note that the shake correction operation of the lens unit 2 of FIG. 10 is repeatedly performed for each correction cycle.

As illustrated in FIG. 10, the lens unit 2 determines whether or not there is a lens correction amount notified from the body unit 1 (SL21).

If the determination result of SL21 is "YES", the lens unit 2 performs a drive control of the optical system drive unit 23 on the basis of the correction amount per one correction cycle calculated from the lens correction amount, and shifts the blurring correction lens indirection to cancel blurring of the subject image formed on the imaging plane (SL22).

After SL22, or if the determination result of SL21 is "NO", the lens unit 2 determines whether or not a new lens correction amount is notified from the body unit 1 (SL23). Note that this notification is based on the notification of SB29 of FIG. 9.

If the determination result of SL23 is "YES", the lens unit 2 updates the lens correction amount notified from the body unit 1 (SL24).

After SL24, or if the determination result of SL23 is "NO", a control relating to the shake correction operation of the lens unit 2 per one correction cycle is terminated.

As described above, according to the second embodiment, in each lens control cycle during a moving image shooting, the body unit 1 having an image stabilization function of higher performance than that of the lens unit 2 performs the shake correction operation on the basis of a result of subtracting the subtraction amount from the calculated image blurring amount, and the lens unit 2 performs the shake correction operation for compensating for the subtraction amount (shake correction shortage). Therefore, in the shake correction operation of the body unit 1, it is possible to widen the shake correction range without degrading the shake correction performance.

Third Embodiment

Next, a third embodiment will be described. In this description, only parts different from those of the second embodiment will be described. In addition, like reference numerals denote like elements as in the second embodiment, and they will not be described repeatedly.

Similarly, according to the third embodiment, assuming that the image stabilization function of the body unit 1 has higher performance than that of the lens unit 2, the body unit 1 having the image stabilization function of higher performance performs a main shake correction operation, and the lens unit 2 performs a subsidiary shake correction operation as described below in more details. In addition, according to the third embodiment, such a shake correction operation starts when the correction amount calculated by the body unit 1 exceeds a predetermined threshold value. The predetermined threshold value is set to, for example, a value corresponding to 50% of the shake correction range of the body unit 1.

Figure 11:
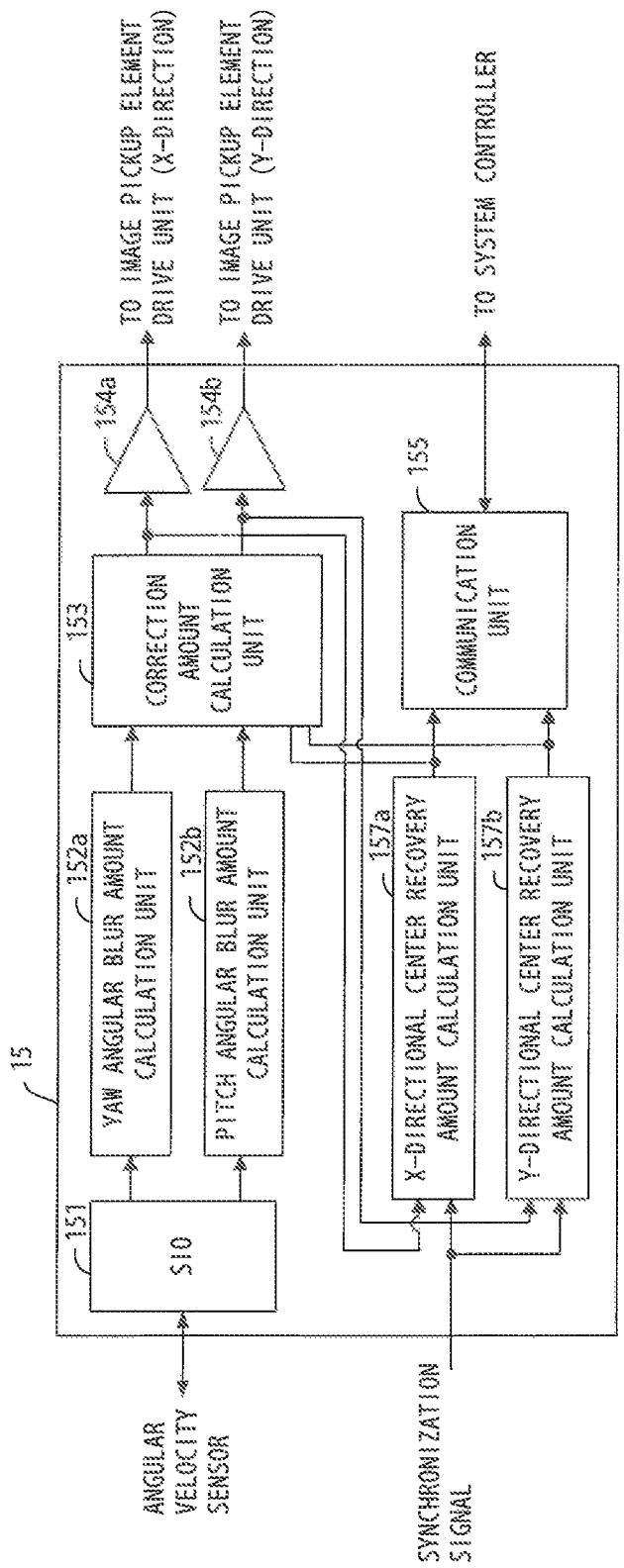
FIG. 11 is a diagram illustrating an exemplary functional configuration of a blurring correction microcomputer according to a third embodiment.

FIG. 11 is a diagram illustrating an exemplary functional configuration of the blurring correction microcomputer 15 according to the third embodiment.

As illustrated in FIG. 11, in the blurring correction microcomputer 15 according to the third embodiment, an input to the X-center recovery amount calculation unit 157*a* is set not as the output of the Yaw angular blur amount calculation unit 152*a*, but as the X-directional output of the correction amount calculation unit 153. Similarly, an input to the Y-center recovery amount calculation unit 157*b* is set not as the output of the Pitch angular blur amount calculation unit 152*b*, but as the Y-directional output of the correction amount calculation unit 153.

In FIG. 11, other configurations are similar to those of the second embodiment.

Figure 12:
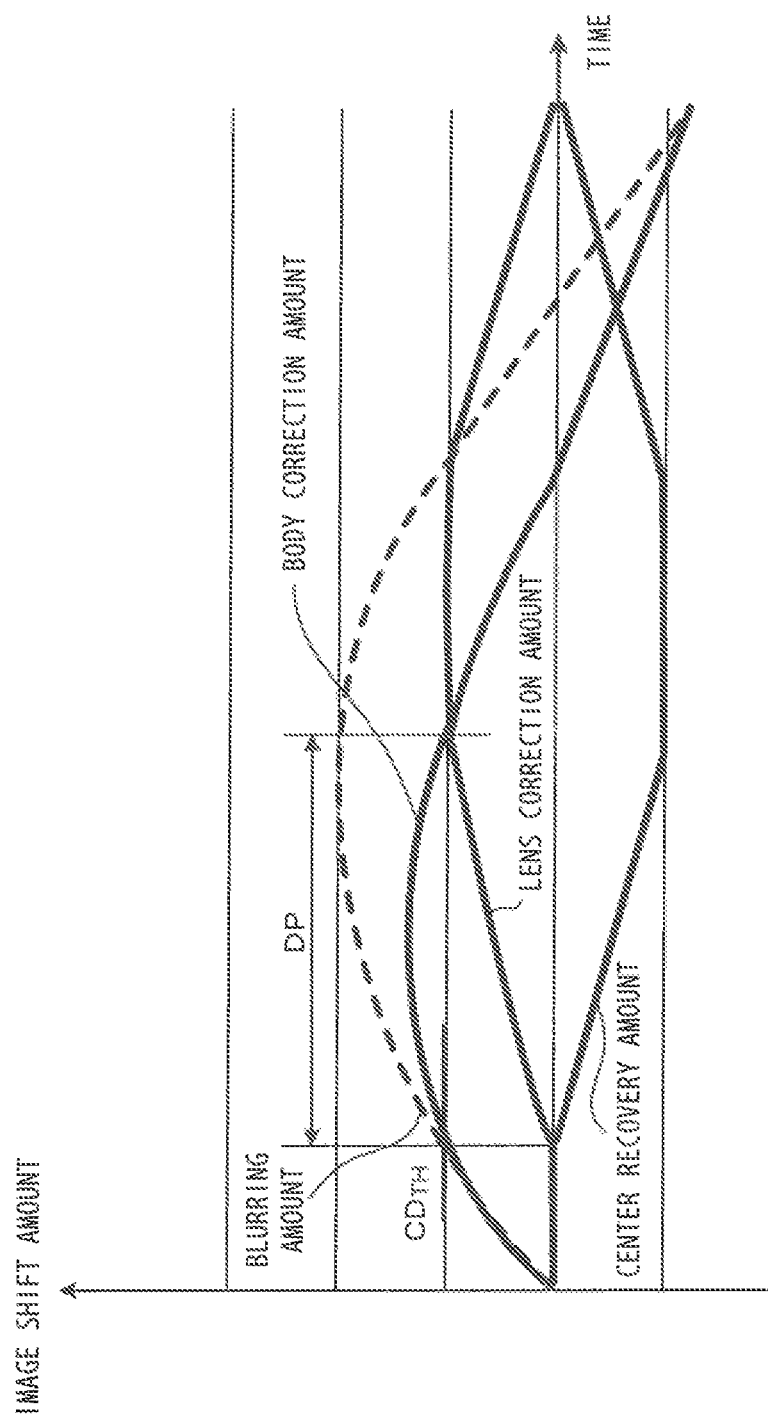
FIG. 12 is a timing chart illustrating an exemplary shake correction operation of the lens unit and the body unit during moving image shooting according to the third embodiment.

FIG. 12 is a timing chart illustrating exemplary shake correction operations of the lens unit 2 and the body unit 1 during a moving image shooting according to the third embodiment.

Here, only a shake correction operation for one of the X-direction and the Y-direction will be described with reference to FIG. 12. Since the shake correction operation of the other direction is similar, it will not be described repeatedly.

In FIG. 12, the ordinate refers to a value corresponding to the image shift amount on the imaging plane, and the horizontal refers to time.

As illustrated in FIG. 12, if the calculated correction amount exceeds a center recovery start threshold $CD_{TH}$, the body unit 1 determines the center recovery amount and a center recovery time DP and notifies them to the lens unit 2. Note that the center recovery time DP may be designated in advance.

Although the center recovery amount is set to the same value as the center recovery start threshold $CD_{TH}$ in this embodiment, the center recovery amount is not limited thereto. In addition, although the center recovery start threshold $CD_{TH}$ is set to a value corresponding to a half (½) of the shake correction range of the body unit 1, the center recovery start threshold $CD_{TH}$ is not limited thereto. For example, in a case where there is a remarkable difference in the shake correction range between the body unit 1 and the lens unit 2, a correction amount corresponding to the shake correction range of the lens unit 2 may be set as the center recovery start threshold $CD_{TH}$. The difference of the shake correction range between the body unit 1 and the lens unit 2 may become remarkably large, for example, when the lens unit 2 has a wide angle or the like. As the lens unit 2 has a wide angle, the shake correction range of the body unit 1 tends to increase, relative to the lens unit 2.

If the center recovery amount and the center recovery time DP are determined, the body unit 1 notifies them to the lens unit 2. In addition, the body unit 1 performs the shake correction operation on the basis of a result of subtracting the center recovery amount ΔD, which is the subtraction amount per one correction cycle based on the center recovery amount, from the calculated correction amount during the center recovery time DP.

Meanwhile, the lens unit 2 notified of the center recovery amount and the center recovery time DP performs the shake correction operation on the basis of the center recovery amount ΔD, which is the subtraction amount per one correction cycle based on the notified center recovery amount, during the notified center recovery time DP to perform the shake correction operation for compensating for the subtraction amount of the body unit 1.

As a result, it is possible to suppress a maximum value of the correction amount in the body unit 1 and widen the correction range as a result. Therefore, it is possible to improve a tolerance level of an amplitude of a camera shake.

Next, exemplary controls relating to shake correction operations of the lens unit 2 and the body unit 1 according to the third embodiment will be described with reference to FIGS. 13 and 14.

Here, only a control relating to the shake correction operation for one of the X-direction and the Y-direction will be described with reference to FIGS. 13 and 14. Since the shake correction operation for the other direction is similar, it will not be described repeatedly.

Figure 13:
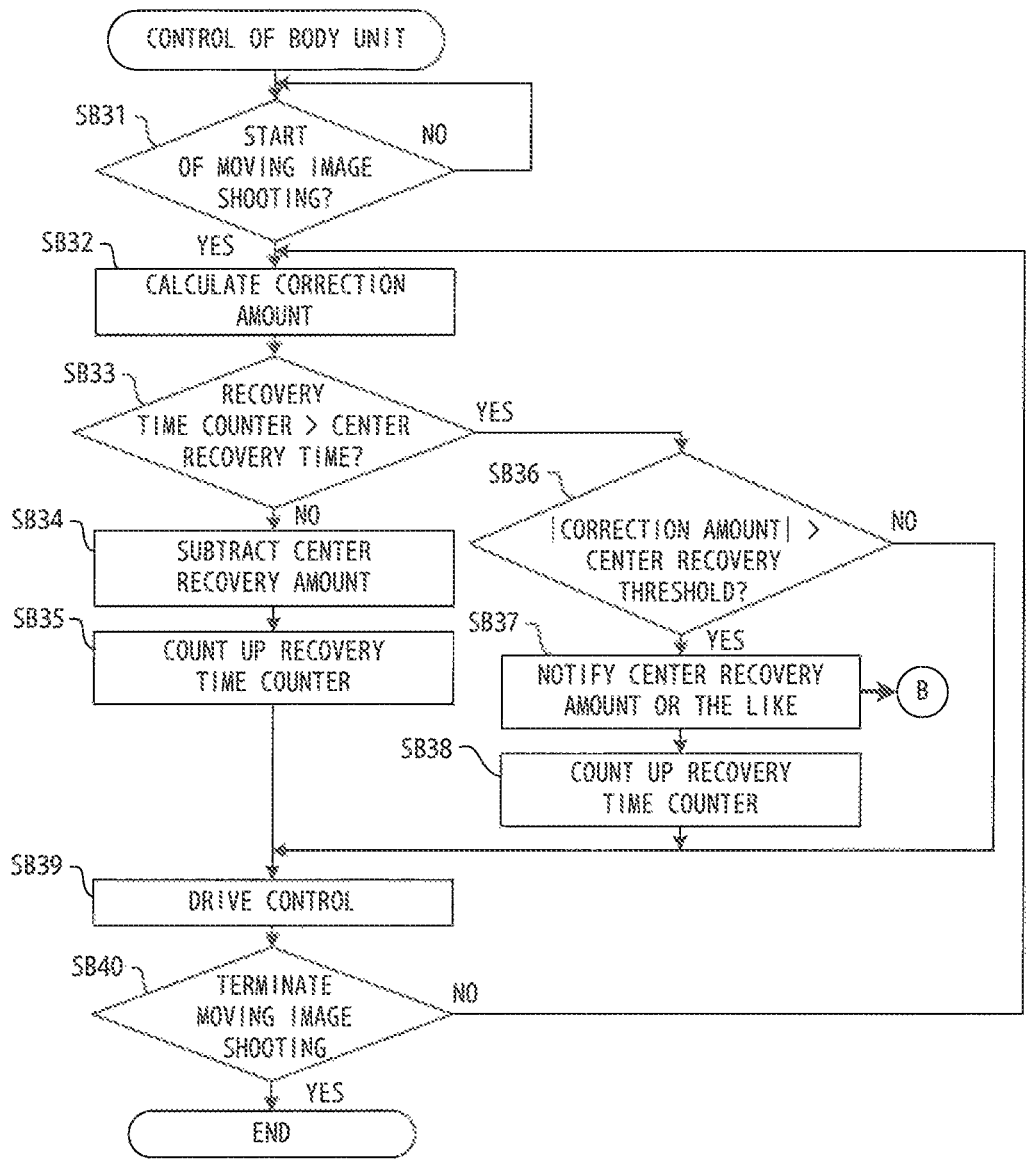
FIG. 13 is a flowchart illustrating an exemplary control relating the shake correction operation of the body unit according to the third embodiment.

FIG. 13 is a flowchart illustrating an exemplary control relating to the shake correction operation of the body unit 1.

As illustrated in FIG. 13, the body unit 1 determines whether or not a moving image shooting start instruction is issued (SB31).

If the determination result of SB31 is "NO", this determination is repeated.

Meanwhile, if the determination result of SB31 is "YES", the body unit 1 calculates the image blurring amount on the basis of the determination result of the angular velocity sensor 16 and further calculates the correction amount on the basis of the calculated image blurring amount (SB32).

Next, the body unit 1 determines whether or not a value of a center recovery time counter exceeds the center recovery time (DP) (SB33). Note that the center recovery time counter is provided, for example, in the system controller 14. The initial value of the center recovery time counter is set to zero. The center recovery time (DP) is set in SB37 described below. However, if the center recovery time is not determined, the determination result of SB33 is processed as "YES".

If the determination result of SB33 is "NO", the body unit 1 subtracts the subtraction amount per one correction cycle (center recovery amount ΔD) based on the center recovery amount (center recovery amount determined SB37 described below) from the correction amount calculated in SB32 (SB34), and counts up a recovery time counter (SB35).

Meanwhile, if the determination result of SB33 is "YES", the body unit 1 determines whether or not an absolute value of the correction amount calculated in SB32 exceeds the center recovery start threshold ($CD_{TH}$) (SB36).

If the determination result of SB36 is "YES", the body unit 1 determines the center recovery amount and the center recovery time (DP), notifies them to the lens unit 2 (SB37), and resets the recovery time counter (SB38). Note that the determined center recovery amount may be, for example, the same value as the center recovery start threshold ($CD_{TH}$), or may be set to a half (½) of the center recovery start threshold ($CD_{TH}$). In addition, the determined center recovery time (DP) may be a fixed value determined in advance or may change depending on the center recovery amount in consideration of the velocity (the velocity of the image pickup element drive unit 13, or the drive velocity of the optical system drive unit 23). In addition, the center recovery amount notified to the lens unit 2 in SB37 is notified as the lens correction amount.

After SB35 or SB38, or if the determination result of SB36 is "NO", the body unit 1 performs a drive control of the image pickup element drive unit 13 to shift the image pickup element 12 in a direction to cancel blurring of the subject image formed on the imaging plane (SB39). Here, in SB39 performed after SB35, a drive control of the image pickup element drive unit 13 is performed on the basis of the subtraction result of SB34. After SB38, or if the determination result of SB36 is "NO", a drive control of the image pickup element drive unit 13 is performed on the basis of the correction amount calculated in SB32.

Next, the body unit 1 determines whether or not the moving image shooting termination instruction is issued (SB40).

If the determination result of SB40 is "NO", the process returns to SB32.

Meanwhile, if the determination result of SB40 is "YES", a control relating to the shake correction operation of the body unit 1 is terminated.

Figure 14:
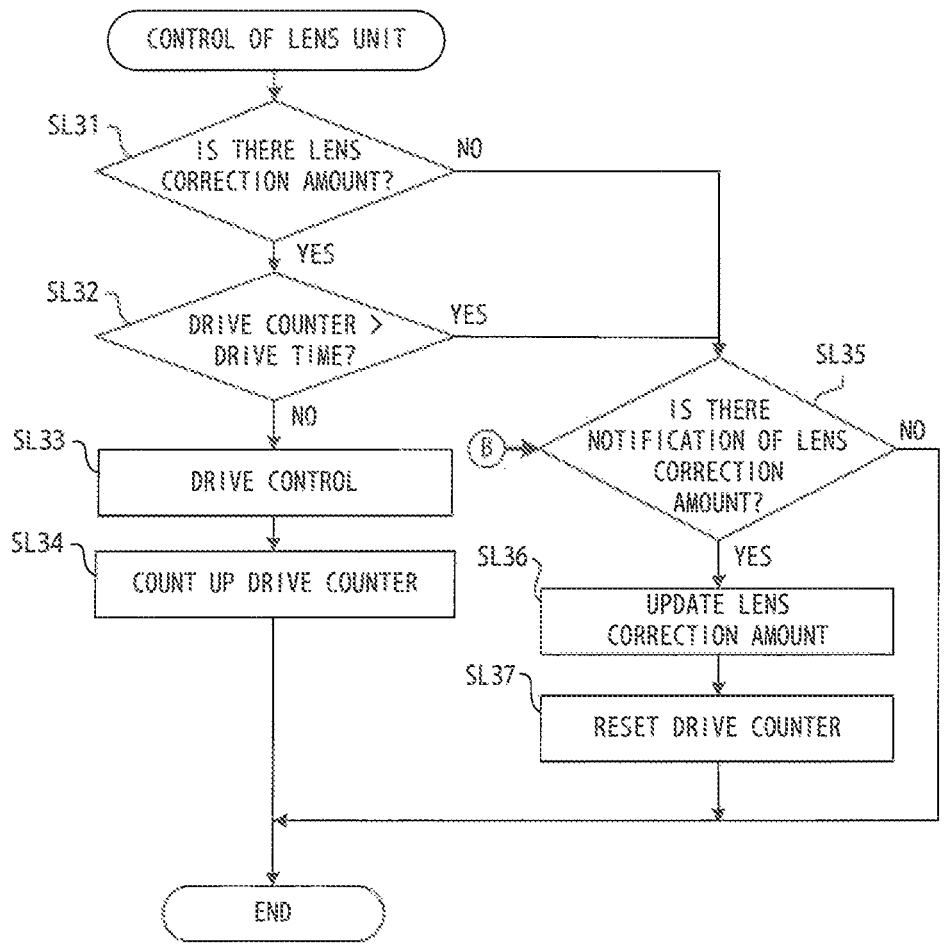
FIG. 14 is a flowchart illustrating an exemplary control relating to the shake correction operation of the lens unit according to the third embodiment.

FIG. 14 is a flowchart illustrating an exemplary control relating to the shake correction operation of the lens unit 2. Note that the blurring correction operation of the lens unit 2 of FIG. 14 is repeatedly performed for each correction cycle.

As illustrated in FIG. 14, the lens unit 2 determines whether or not there is a lens correction amount notified from the body unit 1 (SL31).

If the determination result of SL31 is "YES", the lens unit 2 determines whether or not a value of a drive time counter exceeds a drive time (SL32). Note that the drive time counter is provided, for example, in the LCU 22. An initial value of the drive time counter is set to zero. A drive time is the center recovery time (DP) notified from the body unit 1. However, if the center recovery time (DP) is not notified, the determination result of SL32 is processed as "YES".

If the determination result of SL32 is "NO", the lens unit 2 performs a drive control of the optical system drive unit 23 on the basis of the lens correction amount per one correction cycle based on the lens correction amount notified from the body unit 1, shifts the blurring correction lens in a direction to cancel blurring of the subject image formed on the imaging plane (SL33), and counts up the drive time counter (SL34).

Meanwhile, if the determination result of SL31 is "NO", or if the determination result of SL32 is "YES", the lens unit 2 determines whether or not the lens correction amount (and the center recovery time (DP)) is notified from the body unit 1 (SL35). Note that this notification is based on the notification of SB37 of FIG. 13.

If the determination result of SL35 is "YES", the lens unit 2 updates the lens correction amount notified from the body unit 1 (SL36), and resets the drive time counter (SL37).

After SL34 or SL37, or if the determination result of SL35 is "NO", a control relating to the shake correction operation of the lens unit 2 per one correction cycle is terminated.

As described above, according to the third embodiment, in the center recovery time (DP), the body unit 1 having an image stabilization function of higher performance than that of the lens unit 2 performs the shake correction operation on the basis of a result of subtraction of the subtraction amount from the calculated correction amount, and the lens unit 2 performs the shake correction operation for compensating for the subtraction amount (shake correction shortage). Therefore, in the shake correction operation of the body unit 1, it is possible to widen the shake correction range without degrading the shake correction performance.

According to the third embodiment, in a case where the calculated correction amount exceeds the center recovery start threshold $CD_{TH}$, the shake correction operation is performed during the center recovery time (DP). Therefore, it is not necessary to perform the shake correction operation for each lens control cycle unlike the second embodiment.

Furthermore, since the center recovery time (DP) can be designated, it is possible to select an optimum center recovery time (DP) depending on a characteristic of the image stabilization function of the lens unit 2, the focal length, or the like.

Fourth Embodiment

Next, a fourth embodiment will be described. In this description, like reference numerals denote like elements as in the first to third embodiments, and they will not be described repeatedly.

According to the fourth embodiment, the system controller 14 determines which one of the body unit 1 and the lens unit 2 performs the main shake correction operation.

Figure 15:
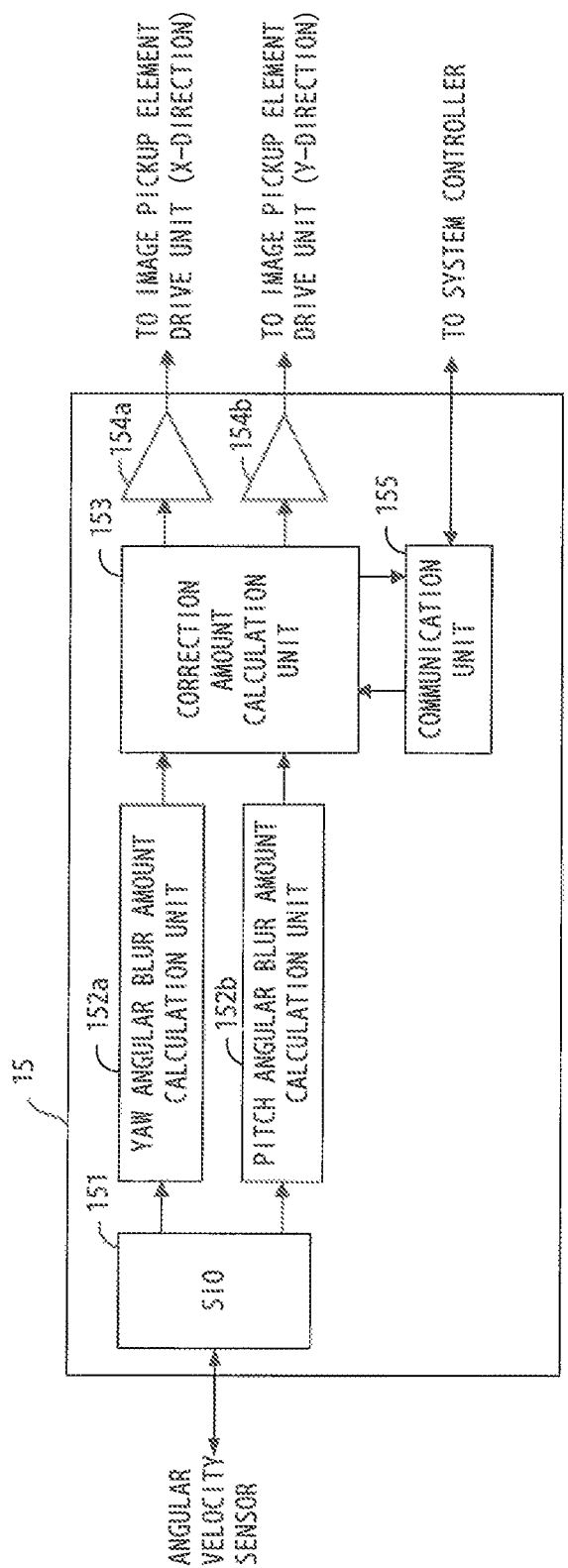
FIG. 15 is a diagram illustrating an exemplary functional configuration of a blurring correction microcomputer according to a fourth embodiment.

FIG. 15 is a diagram illustrating an exemplary functional configuration of the blurring correction microcomputer 15 according to the fourth embodiment.

In the blurring correction microcomputer 15 of FIG. 15, the communication unit 155 notifies the X-directional and Y-directional correction amounts calculated by the correction amount calculation unit 153 to the system controller 14. In addition, the correction amount calculation unit 153 stops the shake correction operation or drives the image pickup element drive unit 13 at a designated velocity depending on an instruction from the system controller 14.

FIG. 16 is a diagram illustrating an exemplary functional configuration of the LCU 22 according to the fourth embodiment.

Note that, in FIG. 16, only main parts relating to the shake correction are illustrated, and other parts are not illustrated for simplicity purposes.

In the LCU 22 of FIG. 16, the correction amount calculation unit 223 stops the shake correction operation or drives the optical system drive unit 23 at a designated velocity depending on an instruction of the system controller 14. In addition, the communication unit 225 notifies the information recorded on the ROM 226 to the system controller 14.

Information regarding the lens unit 2, including information regarding the shake correction performance of the lens unit 2, or information regarding the shake correction range of the lens unit 2, is recorded on the ROM 226.

Figure 17:
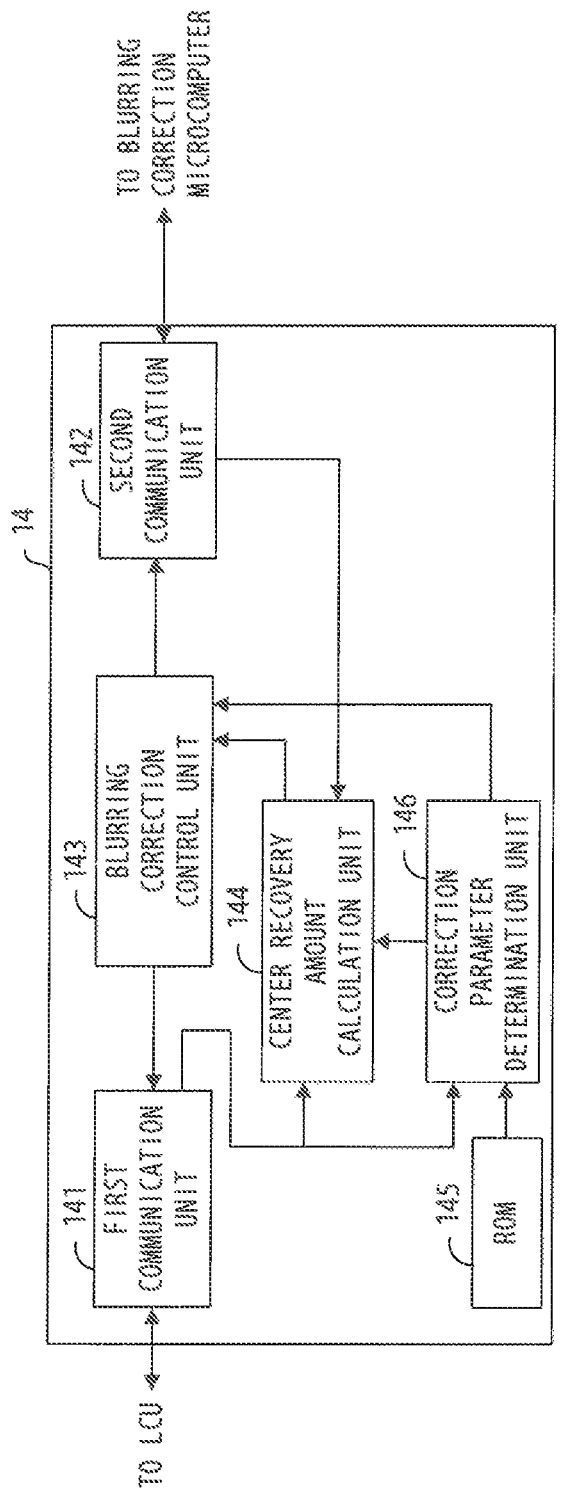
FIG. 17 is a diagram illustrating an exemplary functional configuration of a system controller according to the fourth embodiment.

FIG. 17 is a diagram illustrating an exemplary functional configuration of the system controller 14 according to the fourth embodiment.

However, only main parts relating to the shake correction are illustrated in FIG. 17, and other parts (including the configuration relating to a camera control, an image processing, or the like) are not illustrated for simplicity purposes.

As illustrated in FIG. 17, the system controller 14 according to this embodiment includes a first communication unit 141, a second communication unit 142, a blurring correction control unit 143, a center recovery amount calculation unit 144, a ROM 145, and a correction parameter determination unit 146.

The first communication unit 141 performs communication with the LCU 22, for example, to obtain information regarding the lens unit 2 from the LCU 22 or notify a control instruction for the lens unit 2 to the LCU 22.

The second communication unit 142 performs communication with the blurring correction microcomputer 15, for example, to notify an instruction regarding the shake correction operation to the blurring correction microcomputer 15.

The blurring correction control unit 143 controls the shake correction operation of the body unit 1 so as to instruct a correction start or a correction end to the blurring correction microcomputer 15 via the second communication unit 142 or designate a correction rate to the blurring correction microcomputer 15 via the second communication unit 142, or the like. In addition, the blurring correction control unit 143 instructs the LCU 22 to designate a correction rate via the first communication unit 141. The correction rate is determined by the correction parameter determination unit 146.

The center recovery amount calculation unit 144 calculates the center recovery amount on the basis of the correction amount of the lens unit 2 acquired from the LCU 22 via the first communication unit 141 or the correction amount of the body unit 1 acquired from the blurring correction microcomputer 15 via the second communication unit 142.

Information regarding the body unit 1, including information regarding blurring correction performance of the body unit 1, or information regarding the shake correction range of the body unit 1, is recorded on ROM 145.

The correction parameter determination unit 146 determines the correction parameter (such as various parameters regarding the blurring correction) on the basis of information regarding the lens unit 2, recorded on the ROM 226 and acquired from the LCU 22 via the first communication unit 141 (information regarding the shake correction performance or the shake correction range), and information regarding the body unit 1, recorded on the ROM 145 (including information regarding the shake correction performance or the shake correction range). In addition, the correction parameter determination unit 146 also determines which unit has the higher shake correction performance on the basis of information regarding the shake correction performance of the lens unit 2 and information regarding the shake correction performance of the body unit 1.

Figure 18:
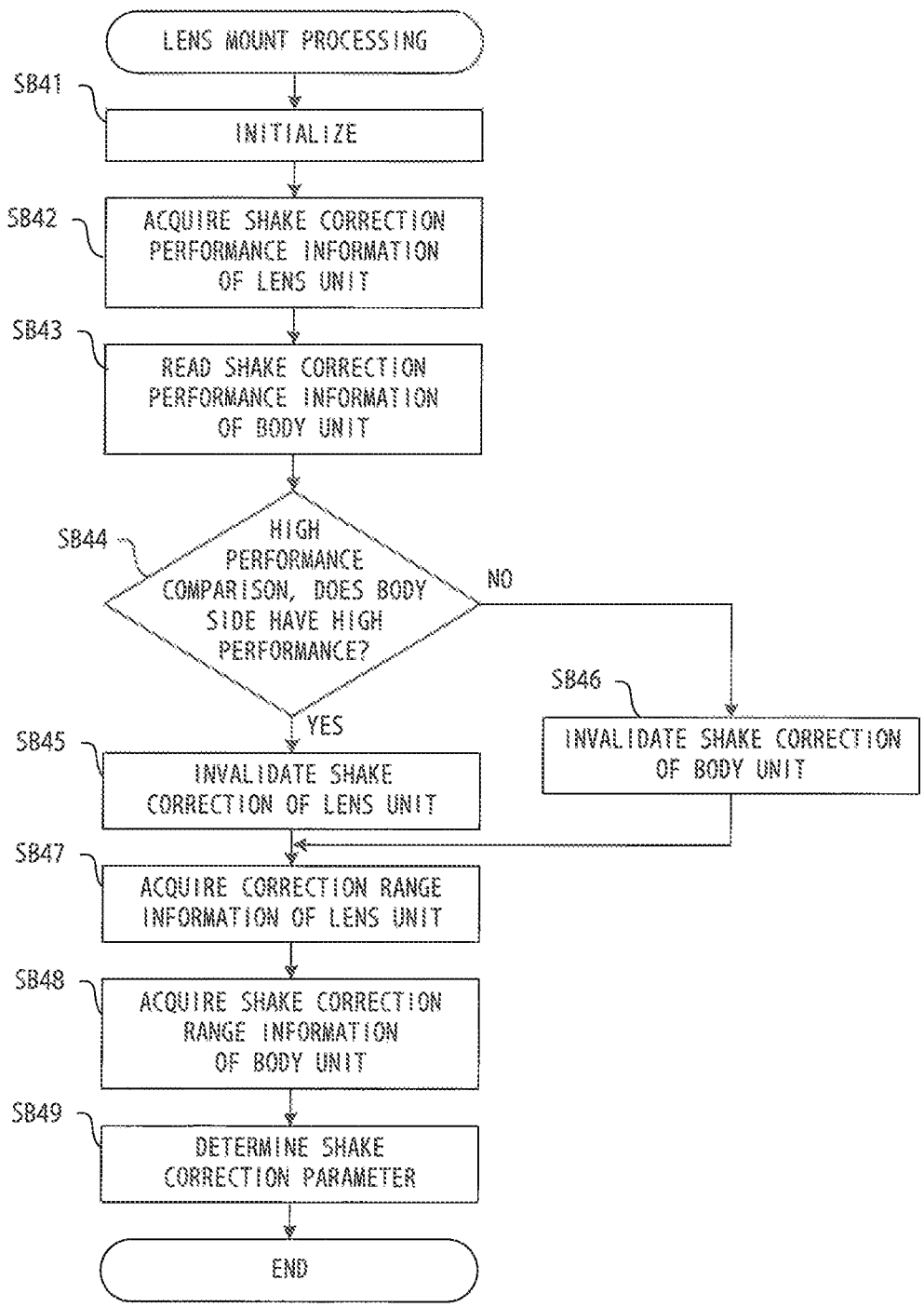
FIG. 18 is a flowchart illustrating an exemplary control of a system controller for determining which one of the body unit and the lens unit performs the main shake correction operation.

FIG. 18 is a flowchart illustrating an exemplary lens mount processing performed by the system controller 14.

Note that this flowchart is also a flowchart illustrating an exemplary control of the system controller 14 for determining which one of the body unit 1 and the lens unit 2 performs the main shake correction operation. This control is performed during an initialization processing of the lens unit 2 called a lens mount processing performed when a camera is powered on, or when the lens unit 2 is installed in the body unit 1. In the lens mount processing, various initialization processings are performed. However, here, only an initialization processing relating to the shake correction will be described, and other initialization processings (such as initialization processing for a focus control, an aperture control, and the like) will not be described.

As illustrated in FIG. 18, first, the system controller 14 initializes a coefficient relating to the shake correction, and instructs the blurring correction microcomputer 15 and the LCU 22 to initialize the image pickup element drive unit 13 and the optical system drive unit 23 (to be driven to an initialization position) (SB41).

Then, the system controller 14 performs communication with the LCU 22 to acquire information regarding the shake correction performance of the lens unit 2 recorded on the ROM 226 of the lens unit 2 (SB42).

Then, the system controller 14 reads information regarding the shake correction performance of the body unit 1 recorded on the embedded ROM 145 (SB43).

Then, the system controller 14 (correction parameter determination unit 146) compares the information regarding the shake correction performance of the lens unit 2 acquired in SB42 and the information regarding the shake correction performance of the body unit 1 read in SB43 to determine whether or not the shake correction performance of the body unit 1 is higher than that of the lens unit 2 (SB44). Resultantly, this determination corresponds to determination on which unit has the higher shake correction performance.

Note that the information regarding the shake correction performance includes information such as a correction stage number, responsiveness, and detection accuracy as indices for indicating correction performance. The correction stage number refers to a shutter stage number for setting the same blurring amount between a case where the shake correction is not performed and a case where the shake correction is performed. As the correction stage number increases, that means higher performance. For responsiveness, the shorter response time means higher performance. For detection accuracy, the smaller detection error means higher performance. In this manner, for the responsiveness and the detection accuracy, the smaller value means the higher performance. Therefore, which one of the responsiveness and the detection accuracy is emphasized may be determined depending on the focal length. For example, a weight of the responsiveness may be set to increase as the focal length increases. A weight of the detection accuracy may be set to increase as the focal length decreases.

If the determination result of SB44 is "YES", the system controller 14 invalidates the image stabilization function of the lens unit 2 (SB45). This invalidation is performed, for example, as the system controller 14 notifies the LCU 22 of the correction rate of zero. The LCU 22 notified of the correction rate of zero does not perform the shake correction based on the detection results of the Yaw angular velocity sensor 24*a* and the Pitch angular velocity sensor 24*b*. Furthermore, in this case, the system controller 14 notifies the blurring correction microcomputer 15 of the correction rate of "1". As a result, the body unit 1 performs the main shake correction operation, and the lens unit 2 performs the subsidiary shake correction operation.

Meanwhile, if the determination result of SB44 is "NO", the system controller 14 invalidates the image stabilization function of the body unit 1 (SB46). This invalidation is performed, for example, as the system controller 14 notifies the blurring correction microcomputer 15 of the correction rate of zero. The blurring correction microcomputer 15 notified of the correction rate of zero does not perform the shake correction based on the detection results of the Yaw angular velocity sensor 16*a* and the Pitch angular velocity sensor 16*b*. Furthermore, in this case, the system controller 14 notifies the LCU 22 of the correction rate of "1". As a result, the lens unit 2 performs the main shake correction operation, and the body unit 1 performs the subsidiary shake correction operation.

After SB45 or SB46, the system controller 14 performs communication with the LCU 22 to acquire information regarding the shake correction range of the lens unit 2 recorded on the ROM 226 (SB47).

Then, the system controller 14 reads information regarding the shake correction range of the body unit 1 recorded on the embedded ROM 145 (SB48).

Then, the system controller 14 (correction parameter determination unit 146) determines the correction parameter on the basis of information regarding the shake correction range of the lens unit 2 acquired in SB47 and information regarding the shake correction range of the body unit 1 read in SB48 (SB49), and terminates the lens mount processing of FIG. 18.

The correction parameter determined in SB49 is different depending on the content of the shake correction operation.

For example, in a case where the shake correction operation same as the first embodiment is performed, an upper limitation of the center recovery amount (CD) is determined as the correction parameter. In this case, the smaller one of the shake correction range of the body unit 1 and the shake correction range of the lens unit 2 is set as the maximum center recovery amount, and the center recovery amount (CD) is determined so as not to exceed this maximum center recovery amount. In addition, information regarding a maximum constant movement velocity of the blurring correction lens caused by the optical system drive unit 23, recorded on the ROM 226, and information regarding a maximum constant movement velocity of the image pickup element 12 caused by the image pickup element drive unit 13, recorded on the ROM 145, may be acquired in association, so that the upper limitation of the center recovery amount (CD) may be determined on the basis of such information and an exposure period of the static image shooting.

For example, in a case where the shake correction operation same as the second embodiment is performed, the correction coefficient α is determined as the correction parameter. In this case, the correction coefficient α is determined on the basis of a ratio between the shake correction range of the body unit 1 and the shake correction range of the lens unit 2. As a result, the center recovery amount (CD) is determined on the basis of the ratio of the shake correction range for an actual correction amount. Therefore, it is possible to improve use efficiency of the shake correction range in both the body unit l and the lens unit 2. In addition, the correction coefficient α may be determined on the basis of the focal length of the optical system 21. For example, if the focal length is long, it is necessary to shift the blurring correction lens to the center position using the optical system drive unit 23 or shift the image pickup element 12 to the center position using the image pickup element drive unit 13 at a high velocity. Therefore, as the focal length increases, a value of the correction coefficient α is set to a large value.

For example, in a case where the shake correction operation same as the third embodiment is performed, the center recovery start threshold ($CD_{TH}$) and the blurring correction control frequency are determined as the correction parameter. In this case, for example, a half (½) of the shake correction range of one of the body unit 1 and the lens unit 2 having the image stabilization function of higher performance is determined as the center recovery start threshold ($CD_{TH}$). For example, the correction control frequency for center recovery is determined by calculating how many times the shake correction range of the unit not having the image stabilization function of higher performance is, compared to a half of the shake correction range of the unit having the image stabilization function of higher performance. Note that, in this case, if there is a remainder by dividing the shake correction range of the unit not having higher performance by a half of the shake correction range of the unit having higher performance, the center recovery start threshold ($CD_{TH}$) is maintained as it is. However, the center recovery amount may be determined on the basis of the remainder.

Figure 19:
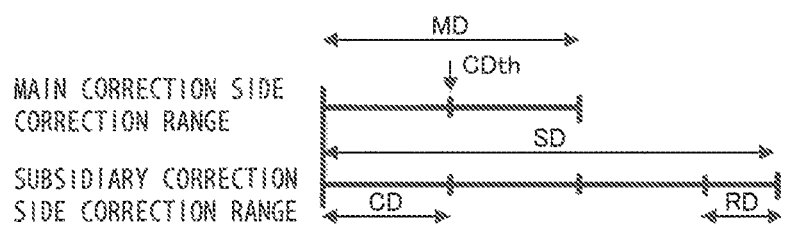
FIG. 19 is a diagram illustrating an exemplary determination of a center recovery amount.

FIG. 19 is a diagram illustrating an exemplary determination on the center recovery amount in this case.

As illustrated in FIG. 19, assuming that the shake correction range of one of the body unit 1 and the lens unit 2 having the image stabilization function of higher performance (main correction side correction range) is denoted by "MD", the shake correction range of the unit not having the image stabilization function of higher performance (subsidiary correction side correction range) is denoted by "SD", a half of "MD" is denoted by the center recovery start threshold $CD_{TH}$ and the center recovery amount is denoted by "CD", the blurring correction control frequency for center recovery becomes "3", so that a remaining correction range RD occurs. In this regard, in the fourth blurring correction control, the blurring correction control is performed by setting the center recovery amount to RD.

In this manner, in a case where the shake correction operation starts after the correction parameter is determined, the blurring correction control unit 143 notifies the correction start instruction, information regarding the focal length of the optical system 21, or the like to the blurring correction microcomputer 15 via the second communication unit 142.

As the shake correction operation starts, the center recovery amount calculation unit 144 acquires the correction amount from the unit that performs the main shake correction operation out of the body unit 1 and the lens unit 2 via the first or second communication unit 141 or 142 at a predetermined timing.

Note that the predetermined timing is an exposure start timing of the static image shooting (also a start timing of the static image shooting) in the case where the shake correction operation same as the first embodiment. In a case where the shake correction operation same as the second embodiment is performed, the predetermined timing is a timing of each correction cycle of the blurring correction control unit 143. In a case where the shake correction operation same as the third embodiment is performed, the predetermined timing is a timing at which the correction amount for the unit that performs the main shake correction operation exceeds the center recovery start threshold ($CD_{TH}$).

In a case where the shake correction operation is performed as in the first or third embodiment, the center recovery amount calculation unit 144 sets the acquired correction amount or the value determined in advance as the center recovery amount. In a case where the shake correction operation same as the second embodiment is performed, the center recovery amount calculation unit 144 multiplies the acquired correction amount by the correction coefficient α determined by the correction parameter determination unit 146, determines the result of multiplication as the center recovery amount, and notifies the determined center recovery amount to the blurring correction control unit 143.

As described above, according to the fourth embodiment, the body unit 1 automatically determines the unit having the higher shake correction performance as the unit that performs the main shake correction operation and determines the optimum correction parameter for the shake correction operation on the basis of the information maintained in each of the body unit 1 and the lens unit 2. Therefore, it is possible to perform an optimum shake correction control while a user does not notice it.

Note that, in a case where the information regarding the shake correction performance is the information indicating that the shake correction performance is zero in this embodiment, the unit that maintains this information may be processed as not having the image stabilization function.

In a case where the shake correction performance is equal between the body unit 1 and the lens unit 2, the correction parameter determination unit 146 may determine that there is no difference between both performance and determine the unit having the wider shake correction range as the unit that performs main shake correction operation. Alternatively, in this case, which unit performs the main shake correction operation may be determined on the basis of the focal length of the optical system 21. In this case, for example, if the focal length of the optical system 21 exceeds a predetermined focal length, the lens unit 2 may be set as the unit that performs the main shake correction operation. Otherwise, if the focal length of the optical system 21 does not exceed the predetermined focal length, the body unit 1 may be set as the unit that performs the main shake correction operation.

According to the aforementioned embodiment, even when there is a difference in performance of the shake correction means mounted in the lens unit and the body unit, it is possible to widen the correction range for the shake correction without degrading the shake correction performance.

While the embodiments have been described hereinbefore, the scope of the disclosure is not limited thereto. In the stage of embodying the disclosure, various modifications or changes may be possible for elements without departing from the spirit and scope of the invention. In addition, various modes may be established by appropriately combining a plurality of elements disclosed in the aforementioned embodiments. For example, all of the elements or some of the elements may be deleted in the aforementioned embodiments. Alternatively, elements commonly used across different embodiments may be combined appropriately.

What is claimed is:

1. An imaging apparatus comprising:
    an optical system configured to form a subject image;
    an image pickup element configured to capture a subject image formed on an imaging plane by the optical system;
    a shake detection sensor configured to detect a shake of the imaging apparatus;
    a microcomputer configured to perform computation for
        a blurring amount calculation section that calculates a blurring amount of the subject image formed on the imaging plane on the basis of a detection result of the shake detection sensor,
        a correction amount calculation section that calculates a correction amount for canceling blurring of the subject image formed on the imaging plane on the basis of the blurring amount,
        a subtraction amount determination section that determines a subtraction amount per predetermined period of time for a correction amount or a blurring amount per predetermined period of time, and
        a subtraction section that subtracts a subtraction amount per one correction cycle based on the subtraction amount per predetermined period of time from the correction amount or the blurring amount;
    a first blurring correction actuator configured to shift a part of the optical system on a plane orthogonal to an optical axis of the optical system in a direction to cancel blurring of the subject image formed on the imaging plane on the basis of any one of a subtraction result of the subtraction section and the subtraction amount per one correction cycle; and
    a second blurring correction actuator configured to shift the image pickup element on the plane orthogonal to the optical axis of the optical system in a direction to cancel blurring of the subject image formed on the imaging plane on the basis of the other of the subtraction result of the subtraction section and the subtraction amount per one correction cycle, wherein
    the predetermined period of time corresponds to a period of time spent on capturing, and
    the subtraction amount per predetermined period of time is a value that is increased or decreased by a prescribed ratio for each correction cycle.

2. The imaging apparatus according to claim 1, wherein the imaging apparatus is a camera system having a lens unit including the optical system configured to be detachably installed in a body unit including the image pickup element,
    the first blurring correction actuator is included in the lens unit, and
    the second blurring correction actuator is included in the body unit.

3. The imaging apparatus according to claim 2, further comprising:
    a lens information storing memory configured to store information regarding shake correction performance of the lens unit;
    a body information storing memory configured to store information regarding shake correction performance of the body unit; and
    a body controller having a performance determination section that determines which one of shake correction performance of the lens unit and shake correction performance of the body unit is high performance on the basis of the information stored in the lens information storing memory and the information stored in the body information storing memory,
    wherein a blurring correction actuator included in a unit having shake correction performance determined as high performance by the performance determination section is operated on the basis of a subtraction result of the subtraction section.

4. The imaging apparatus according to claim 3, wherein the performance determination section determines that there is no difference in performance in a case where there is no difference between the shake correction performance of the lens unit and the shake correction performance of the body unit, and
    in a case where the performance determination section determines that there is no difference in performance, the correction range of the first blurring correction actuator and the correction range of the second blurring correction actuator are compared, and the blurring correction actuator having a wider correction range is operated on the basis a result of the subtraction of the subtraction section.

5. The imaging apparatus according to claim 3, wherein the performance determination section determines that there is no difference in performance in a case where there is no difference between the shake correction performance of the lens unit and the shake correction performance of the body unit, and
    in a case where the performance determination section determines that there is no difference in performance, which one of the first blurring correction actuator and the second blurring correction actuator is operated on the basis of a result of the subtraction of the subtraction section is determined on the basis of a focal length of the optical system.

6. The imaging apparatus according to claim 5, wherein, in a case where the focal length of the optical system exceeds a predetermined focal length, the first blurring correction actuator is operated on the basis of a result of the subtraction of the subtraction section, and in a case where the focal length of the optical system does not exceed the predetermined focal length, the second blurring correction actuator is operated on the basis of a result of the subtraction of the subtraction section.

7. The imaging apparatus according to claim 3, wherein each of information regarding the shake correction performance of the lens unit and information regarding the shake correction performance of the body unit contains information regarding a shake correction stage number.

8. The imaging apparatus according to claim 1, wherein the subtraction amount determination section determines a correction amount calculated by the correction amount calculation section at an exposure start of static image shooting as the subtraction amount per predetermined period of time, and the predetermined period of time is an exposure period of the static image shooting.

9. The imaging apparatus according to claim 8, wherein the subtraction amount per predetermined period of time determined by the subtraction amount determination section is an amount for setting an image center deviation of the subject image formed on the imaging plane at the exposure start to zero during the exposure period.

10. The imaging apparatus according to claim 1, wherein the subtraction amount determination section determines the subtraction amount per predetermined period of time on the basis of the blurring amount calculated by the blurring amount calculation section for each predetermined cycle, and the predetermined period of time is the predetermined cycle.

11. The imaging apparatus according to claim 10, wherein the predetermined cycle is a focus control cycle of the optical system.

12. The imaging apparatus according to claim 10, wherein the predetermined cycle is a frame rate during moving image shooting.

13. The imaging apparatus according to claim 1, wherein, in a case where the correction amount calculated by the correction amount calculation section exceeds a predetermined threshold value, the subtraction amount determination section determines the subtraction amount per predetermined period of time and the predetermined period of time.

14. The imaging apparatus according to claim 13, wherein the subtraction amount determination section determines the predetermined threshold value as the subtraction amount per predetermined period of time.

15. The imaging apparatus according to claim 13, wherein the subtraction amount determination section determines the predetermined period of time on the basis of a value of the subtraction amount per predetermined period of time.

16. The imaging apparatus according to claim 13, wherein the predetermined threshold value is determined on the basis of a correction range of the first blurring correction actuator or a correction range of the second blurring correction actuator.

17. A shake correction method executed in an imaging apparatus having an optical system that forms a subject image and an image pickup element that captures a subject image formed on an imaging plane by the optical system, the shake correction method comprising:

detecting a shake of the imaging apparatus;
calculating a blurring amount in a subject image formed on the imaging plane on the basis of a result of the detection;
calculating a correction amount for canceling blurring of the subject image formed on the imaging plane on the basis of the blurring amount;
determining a subtraction amount per predetermined period of time for a blurring amount or a correction amount per predetermined period of time;
subtracting a subtraction amount per one correction cycle based on the subtraction amount per predetermined period of time from the blurring amount or the correction amount;
shifting a part of the optical system on a plane orthogonal to an optical axis of the optical system in a direction to cancel blurring of the subject image formed on the imaging plane on the basis of any one of a result of the subtraction and the subtraction amount per one correction cycle; and
shifting the image pickup element on the plane orthogonal to the optical axis of the optical system in a direction to cancel blurring of the subject image formed on the imaging plane on the basis of the other of the result of the subtraction and the subtraction amount per one correction cycle, wherein
the predetermined period of time corresponds to a period of time spent on capturing, and
the subtraction amount per predetermined period of time is a value that is increased or decreased by a prescribed ratio for each correction cycle.

18. A lens unit configured to be detachably installed in a body unit having an image pickup element that captures a subject image formed on an imaging plane using an optical system and a first blurring correction actuator that shifts the image pickup element on a plane orthogonal to an optical axis of the optical system in a direction to cancel blurring of a subject image formed on the imaging plane on the basis of a first correction amount, the lens unit comprising:

the optical system configured to form a subject image;
a shake detection sensor configured to detect a shake of the lens unit;
a lens controller configured to perform computation for
a blurring amount calculation section that calculates a blurring amount of the subject image formed on the imaging plane on the basis of a detection result of the shake detection sensor,
a correction amount calculation section that calculates a second correction amount for canceling blurring of the subject image formed on the imaging plane on the basis of the blurring amount,
a communication section that transmits the second correction amount calculated by the correction amount calculation section to the body unit at a predetermined timing and receives, from the body unit, a subtraction amount per one correction cycle as the first correction amount determined by the body unit on the basis of the second correction amount, and
a subtraction section that subtracts the subtraction amount per one correction cycle from the second correction amount; and
a second blurring correction actuator configured to shift a part of the optical system on the plane orthogonal to the optical axis of the optical system in a direction to cancel blurring of the subject image formed on the imaging plane on the basis of a result of the subtraction of the subtraction section, wherein the predetermined period timing corresponds to a time at which capturing is conducted, and the first correction amount is a value that is increased or decreased by a prescribed ratio for each correction cycle.

19. A body unit in which a lens unit is configured to be detachably installed, the lens unit having an optical system that forms a subject image and a first blurring correction actuator for shifting a part of the optical system on a plane orthogonal to an optical axis of the optical system in a direction to cancel blurring of the subject image formed by the optical system on an imaging plane on the basis of a first correction amount, the body unit comprising:

an image pickup element configured to capture the subject image formed on the imaging plane by the optical system;

a shake detection sensor configured to detect a shake of the body unit; and a microcomputer configured to perform computation for
a blurring amount calculation section that calculates a blurring amount of the subject image formed on the imaging plane on the basis of a detection result of the shake detection sensor, a correction amount calculation section that calculates a second correction amount for canceling blurring of the subject image formed on the imaging plane on the basis of the blurring amount, a subtraction amount determination section that determines a subtraction amount per predetermined period of time for a second correction amount per predetermined period of time, and a subtraction section that subtracts a subtraction amount per one correction cycle based on the subtraction amount per predetermined period of time from the second correction amount;

a second blurring correction actuator configured to shift the image pickup element on the plane orthogonal to the optical axis of the optical system in a direction to cancel blurring of the subject image formed on the imaging plane on the basis of a subtraction result of the subtraction section; and a body controller having a communication section configured to transmit the subtraction amount per predetermined period of time used in determination of the first correction amount to the lens unit, wherein the predetermined period of time corresponds to a period of time spent on capturing, and the subtraction amount per predetermined period of time is a value that is increased or decreased by a prescribed ratio for each correction cycle.

20. An imaging apparatus comprising:

an optical system configured to form a subject image;

an image pickup element configured to capture a subject image formed on an imaging plane by the optical system;

a shake detection sensor configured to detect a shake of the imaging apparatus;

a microcomputer configured to perform computation for
a blurring amount calculation section that calculates a blurring amount of the subject image formed on the imaging plane on the basis of a detection result of the shake detection sensor, a correction amount calculation section that calculates a correction amount for canceling blurring of the subject image formed on the imaging plane on the basis of the blurring amount, a subtraction amount determination section that determines a correction amount calculated by the correction amount calculation section at an exposure start of static image shooting as a subtraction amount per predetermined period of time, and a subtraction section that subtracts a subtraction amount per one correction cycle based on the subtraction amount per predetermined period of time from the correction amount or the blurring amount;

a first blurring correction actuator configured to shift a part of the optical system on a plane orthogonal to an optical axis of the optical system in a direction to cancel blurring of the subject image formed on the imaging plane on the basis of any one of a subtraction result of the subtraction section and the subtraction amount per one correction cycle; and a second blurring correction actuator configured to shift the image pickup element on the plane orthogonal to the optical axis of the optical system in a direction to cancel blurring of the subject image formed on the imaging plane on the basis of another of the subtraction result of the subtraction section and the subtraction amount per one correction cycle, wherein the predetermined period of time is an exposure period of the static image shooting.

21. An imaging apparatus comprising:

an optical system configured to form a subject image;

an image pickup element configured to capture a subject image formed on an imaging plane by the optical system;

a shake detection sensor configured to detect a shake of the imaging apparatus;

a microcomputer configured to perform computation for
a blurring amount calculation section that calculates a blurring amount of the subject image formed on the imaging plane on the basis of a detection result of the shake detection sensor, a correction amount calculation section that calculates a correction amount for canceling blurring of the subject image formed on the imaging plane on the basis of the blurring amount, a subtraction amount determination section that determines a subtraction amount per predetermined period of time for a correction amount on the basis of the blurring amount calculated by the blurring amount calculation section for each predetermined cycle, and a subtraction section that subtracts a subtraction amount per one correction cycle based on the subtraction amount per predetermined period of time from the correction amount or the blurring amount;

a first blurring correction actuator configured to shift a part of the optical system on a plane orthogonal to an optical axis of the optical system in a direction to cancel blurring of the subject image formed on the imaging plane on the basis of any one of a subtraction result of the subtraction section and the subtraction amount per one correction cycle; and a second blurring correction actuator configured to shift the image pickup element on the plane orthogonal to the optical axis of the optical system in a direction to cancel blurring of the subject image formed on the imaging plane on the basis of another of the subtraction result of the subtraction section and the subtraction amount per one correction cycle, wherein the predetermined period of time is the predetermined cycle, and the predetermined cycle is a frame rate during moving image shooting.

* * * * *